United States Patent
Mimlitz

(10) Patent No.: US 11,041,738 B1
(45) Date of Patent: Jun. 22, 2021

(54) SIGNAL ACTIVATED SWITCH FOR METERS EQUIPPED WITH AUTOMATIC METER READING OUTPUT CAPABILITY

(71) Applicant: James E. Mimlitz, Glencoe, MO (US)

(72) Inventor: James E. Mimlitz, Glencoe, MO (US)

( * ) Notice: Subject to any disclaimer, the term of this patent is extended or adjusted under 35 U.S.C. 154(b) by 0 days.

(21) Appl. No.: 16/856,921

(22) Filed: Apr. 23, 2020

Related U.S. Application Data

(60) Provisional application No. 62/849,723, filed on May 17, 2019.

(51) Int. Cl.
*G01D 4/00* (2006.01)
*H04M 11/00* (2006.01)

(52) U.S. Cl.
CPC .......... *G01D 4/004* (2013.01); *H04M 11/002* (2013.01); *H04Q 2209/60* (2013.01)

(58) Field of Classification Search
CPC .............................. G01D 4/004; H04M 11/002
USPC ........................................ 340/870.02–870.03
See application file for complete search history.

(56) References Cited

U.S. PATENT DOCUMENTS

| | | | | |
|---|---|---|---|---|
| 4,315,251 | A * | 2/1982 | Robinson | H04Q 9/14 340/4.21 |
| 4,396,915 | A * | 8/1983 | Farnsworth | H02J 13/00009 340/870.03 |
| 5,856,791 | A | 1/1999 | Gray et al. | |
| 6,657,552 | B2 | 12/2003 | Belski et al. | |
| 2013/0027219 | A1 * | 1/2013 | Myoung | H04Q 9/00 340/870.03 |

OTHER PUBLICATIONS

Author: Mueller Systems, Title: TRuRead Remote Display, Title of item: Catalog page, Date: Feb. 12, 2013, Page/Volume: muellersystems. com > Mar. 2016 > TRuRead—Feb. 12, 2013 Publisher: Mueller Systems, Country Published: USA.
Author: TiSales, Title: Specification Sheet DR3, Title of item: Catalog page, Date: Unknown, Page/Volume: www.tisales.com > DR3-Digital-Remote-ProdSheet, Publisher: TiSales, Country Published: USA.
Author: Kemp-Meek MFG. Inc., Title: VL9 Remote Reader for Water Meters, Title of item: Catalog page, Date: Nov. 2010, Page/Volume: https://kempmeek.com/our-products/visu-link/, Publisher: Kemp-Meek MFG. Inc., Country Published: USA.
Author: MARS Co., Title: Remote Counter Modules for Water & Gas, Title of item: Installation Guide, Date: Mar. 5, 2019, Page/Volume: https://www.marswater.com/info/download, Publisher: MARS Co., Country Published: USA.

* cited by examiner

*Primary Examiner* — Albert K Wong
(74) *Attorney, Agent, or Firm* — Kevin L. Klug

(57) ABSTRACT

A signal activated switch for meters equipped with automatic meter reading output capability which allows a single water or gas meter to be interrogated by two or more meter interrogation units or meter reading devices without interference. The art of the present invention senses an interrogation by a meter interrogation unit and switches the meter interrogation unit onto the meter circuit for a brief period in order to read the internally stored data of the meter via an industry standard automatic meter reading communication protocol. The signal activated switch may integrate a display which allows display of internally stored consumption data, rate-of-flow, or water meter serial number. The signal activated switch also defaults to a first or primary meter interrogation unit should power be interrupted to the signal activated switch.

20 Claims, 21 Drawing Sheets

Terminal Block Hookup –

| Terminal | Function | Sensus Meter Color (Badger, Metron-Farnier, Master Meter, Kamstrup, Mueller, Zenner, RG3) | Neptune Color | Elster Color |
|---|---|---|---|---|
| 1 | Meter Clock | Red | Black | Wht\|Grn |
| 2 | Meter Data | Green\|White | Red | Red |
| 3 | Meter Ground | Black | Green | Black |
| 4 | Utility AMI Clock | Red | Black | Wht\|Grn |
| 5 | Utility AMI Data | Green\|White | Red | Red |
| 6 | Utility AMI Ground | Black | Green | Black |

<u>Wiring Notes:</u>

1. With the exceptions of Neptune Technology Group and Elster-AMCO (Honeywell), most meter manufacturers follow the Sensus wire color-coding scheme.
2. <u>Meter</u> Terminal Block Hookup (Terminals 1,2,3): Apply the color-coding that pertains to the manufacturer of the Water Meter.
3. <u>Utility AMI/AMR</u> Terminal Block Hookup (Terminals 4,5,6): Apply the color-coding that pertains to the manufacturer of the AMI/AMR Endpoint.
4. Alternative color-coding: manufacturers occasionally substitute a WHITE wire for a GREEN wire.

Dip Switch Settings –

| 1<br>2 | Meter Brand | Sensus: 1=Down 2=Down<br>Neptune: 1=Up 2=Down<br>Elster: 1=Down 2=Up |
|---|---|---|
| 3<br>4<br>5 | Totalizer Units | Gal: 3=Down 4=Down 5=Down<br>CuFt: 3=Up 4=Down 5=Down<br>L: 3=Down 4=Up 5=Down<br>CuM: 3=Up 4=Up 5=Down<br>AcreFt: 3=Down 4=Down 5=Up<br>Units: 3=Up 4=Up 5=Up |
| 6 | Display Appx Rate-of-Flow | ON: 6=Up |
| 7 | Display Meter ID | ON: 7=Up |
| 8 | Backlight Enable | ON: 8=Up |

Rotary Switch Settings –

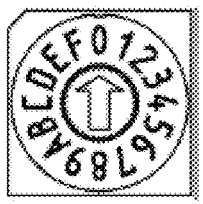

| 0 | x 1 (No Multiplier) |
|---|---|
| 1 | x 10 |
| 2 | x 100 |
| 3 | x 100 |
| 4 | x 1,000 |
| 5 | x 10,000 |
| 6 | x 100,000 |
| 7 | x 1,000,000 |
| F | x 0.1 |
| E | x 0.01 |
| D | x 0.001 |
| C | x 0.0001 |
| B | x 0.00001 |
| A | x 0.000001 |
| 9 | x 0.0000001 |

Figure 15

Sample Screenshots –
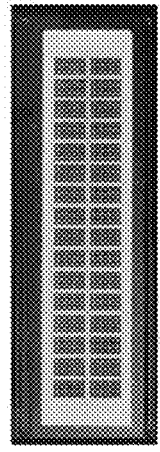
Pixel Integrity Test
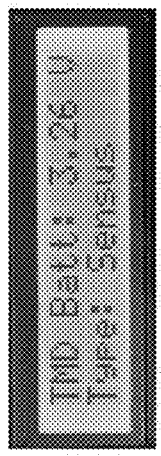
Battery Voltage Indication
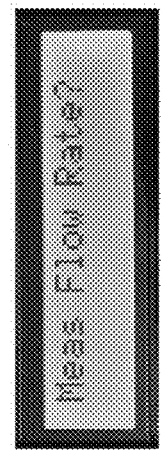
Prompt for Flow Rate
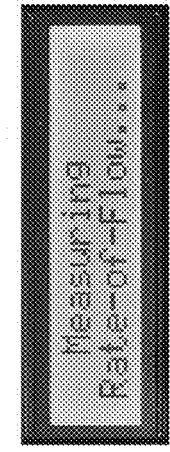
Status Indication
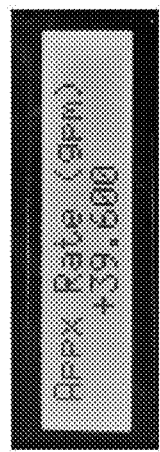
Rate in Gallons per Minute
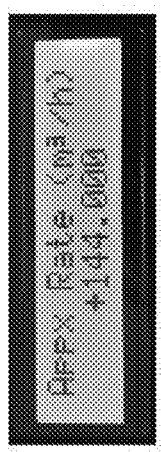
Rate in Cubic Meters per Hour
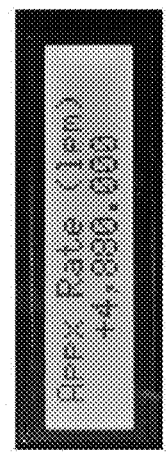
Rate in Liters per Minute
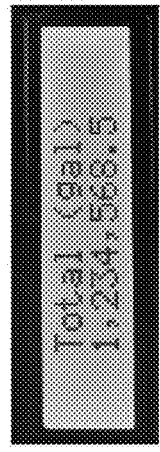
Gallon Registration
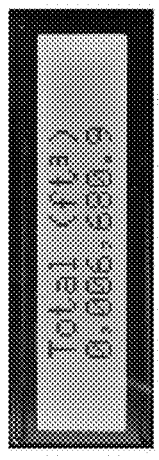
Cubic Foot Registration
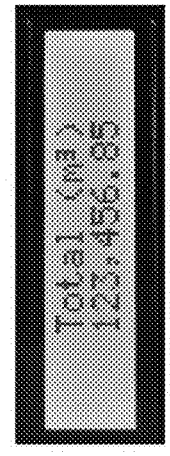
Cubic Meter Registration
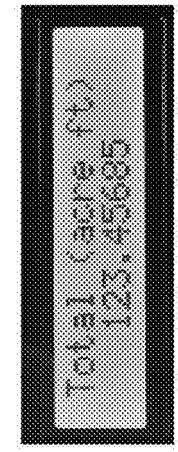
Acre Foot Registration
Figure 16

SIGNAL ACTIVATED SWITCH FOR METERS EQUIPPED WITH AUTOMATIC METER READING OUTPUT CAPABILITY

This application claims priority of U.S. Provisional Patent Application No. 62/849,723, filed May 17, 2019, entitled Signal Activated Switch for Meters Equipped with Automatic Meter Reading Output Capability.

BACKGROUND OF THE INVENTION

The art of the present invention relates to a signal splitter or switch for viscous fluid or gas flow meters (or other types of meters) that are equipped with an industry standard automatic meter reading (AMR) communication protocol capability in general and more particularly to a switch that senses an interrogation of said meter by an attached meter interrogation unit and switches said interrogation unit onto the circuit of said meter without parasitic signal losses or interference with the communication protocols of the meter interrogation unit or meter. The present invention is capable of allowing a single meter to be interrogated by two or more meter interrogation units or meter reading devices such as a meter transmission unit (MTU).

Examples of automatic meter reading (AMR) communication protocols include, but are not limited to, the 3-wire protocol invented by Sensus® USA Inc., the 3-wire protocol invented by Neptune® Technology Group, and the 3-wire protocol invented by Honeywell Elster® Metering. The aforesaid protocols are utilized by numerous utilities and industries in order to read meters present in residential and commercial locations. Automatic meter reading (AMR) capable flow meters are generally equipped with a single, simplex data output cable and thus are intended to be connected to a single meter interrogation unit or interrogation device. This signal cable typically contains three (3) internal wires or signal lines which represent a first clock signal line, a second data signal line, and a third ground line. These wires are usually color coded to signify their purposes, although there is no industry accepted color coding scheme. For example, Sensus® USA Inc. codes the wires as red (clock), green (data), and black (ground). Neptune® Technology Group Inc. codes the wires as black (clock), red (data), and green (ground). Other manufacturer specific color codings exist, as well.

A common metering example is that of a utility owned water meter that internally counts and stores the total volume (typically gallons or liters) of water that has been delivered to a commercial or residential property. The water utility typically attaches an interrogation device or meter interrogation unit, often with an integral radio transmitter, to the water meter and collects the internally stored consumption data via a wireless receiver system. When equipped with said radio transmitter, said interrogation device or meter interrogation unit is often referred to as a meter transmission unit (MTU).

Relating to the present invention, there are many instances where two or more parties or meter interrogation units desire to simultaneously or sequentially access the reading from the same meter. An example may include a commercial facility that wishes to monitor its water consumption in order to implement its own leak-detection and water conservation efforts in parallel with the local water utility which desires to monitor the same meter for monthly billing purposes. Nevertheless, a parallel wire-spliced connection of two (or more) meter interrogation units with a single automatic meter reading (AMR) capable flow meter will generally cause both meter interrogation units to not function. This is due to the simplex electronic circuit architecture inherent within both the flow meter and the meter interrogation units.

Prior art attempts to allow more than one meter interrogation unit to interrogate and read a single automatic meter reading (AMR) capable flow meter have consisted of parasitically powered detection and switching circuits, as illustrated in the schematic of FIG. 4. The prior art relies upon a significant electrical current drawn away from the clock signal line or the AMR2.TX line of the second meter interrogation unit which often causes unacceptable distortion of the clock signal line or the AMR2.TX signal. The aforesaid parasitic distortion results in an incompatibility or incorrect readings with the plurality of meter interrogation units or meter transmission unit equipment presently available within the metering industry. In order to overcome the limitations of the prior art, many entities often install a secondary flow meter downstream of the main meter as shown in FIG. 5. This allows the entity to obtain an approximation of the primary metering data but incurs extra and unnecessary costs.

The present invention provides a novel, streamlined, electronics-based solution to the aforesaid problem. Also, the present art solution does not require modification of the installed flow meters or modification of the meter interrogation unit or MTU's. The present art also makes use of a battery or energy storage or supply source to power three switching relay contacts or relays in a preferred embodiment, thereby obviating the need to draw significant electrical current from the meter interrogation unit or MTU for this purpose. Alternative embodiments may utilize a plurality of relay contacts, solid state switches, or relays and a plurality of energy storage or supply sources, including but not limited to batteries, supercapacitors, solar cells, and line power. Because the clock signal line or AMR2.TX waveform of the meter interrogation unit or MTU is subject to a minimal loading, the distortion of this critical signal is not appreciable and thereby compatibility is realized with a wide range of meter interrogation units or MTU equipment.

Although prior art devices have been disclosed that allow a single meter interrogation unit or MTU to read or interrogate two or more meters, such as U.S. Pat. No. 5,856,791, to date the state of the art is bereft of art which allows two or more meter interrogation units or MTUs to interrogate and read a single AMR meter.

Accordingly, it is an object of the present invention to provide a signal activated switch for meters equipped with automatic meter reading output capability which allows two or more meter interrogation units or MTUs to address, interrogate, and read a single automatic meter reading or AMR meter.

Another object of the present invention is to provide a signal activated switch for meters equipped with automatic meter reading output capability which does not parasitically load or interfere with any of the transmit, clock, receive or ground lines of the meter interrogation unit, MTU, or automatic meter reading (AMR) meter.

A further object of the present invention is to provide a signal activated switch for meters equipped with automatic meter reading output capability that utilizes such a minimal amount of energy whereby the energy storage or battery power supply is extremely small and will last for a decade or more under normal operation.

A still further object of the present invention is to provide a signal activated switch for meters equipped with automatic meter reading output capability which utilizes a very small or microamp current draw when not addressed by a meter interrogation unit or MTU.

A yet further object of the present invention is to provide a signal activated switch for meters equipped with automatic meter reading output capability which allows uninterrupted and uncorrupted communication by the meter interrogation unit or MTU of a local water utility with the AMR meter even if the battery or power supply source of the present invention is disconnected.

An even further object of the present invention is to provide a signal activated switch for meters equipped with automatic meter reading output capability which integrates a display which allows a user to display the AMR meter internally stored consumption data, rate-of-flow, water meter serial number, or present art circuit battery voltage when a button is pressed

SUMMARY OF THE INVENTION

In accordance with the present invention, the preferred embodiment represents a signal activated switch for meters equipped with automatic meter reading output capability which is able to seamlessly allow normal automatic meter reading (AMR) by a local water utility (or other utility) of an AMR meter yet also allow another one or more meter interrogation units or meter reading devices to interrogate the AMR meter without interruption or interference with the local water utility. An alternative embodiment of the present invention integrates a display (preferably a liquid crystal display) which allows a user to display the AMR meter internally stored consumption data, rate-of-flow, water meter serial number, or present art circuit battery voltage when a button is pressed. Inherent in the design of all embodiments is the ability to also seamlessly pass through signals from two wire sinewave type reading devices such as an industry accepted touchpad without degradation of any of the communication signals. Unlike prior art devices, the aforesaid and other new and useful advantages of the present art are enabled by the inherent pass through substantially zero impedance path between the utility's meter interrogation unit or meter reading device and the AMR meter which is offered by the present art, even if the battery or power supply of the present art is non-existent or depleted. Prior art devices, such as the Smart Meter-Master by F.S. Brainard & Co. or the TruRead by Mueller Systems, utilize buffering circuitry that requires a battery or external power source in order for the utility to read the AMR meter. This prior art failure possibility is unacceptable for the utility industry.

The present art switch provides an interface for two or more meter interrogation units or meter transmission units (MTUs) to address, interrogate, and read a single automatic meter reading (AMR) meter without interfering with the operation of any of the interrogation units or meters and without parasitic losses, all while using a minimal amount of power.

Because two or more meter interrogation units or meter transmission units (MTUs) cannot be simultaneously connected in parallel to a single AMR meter without signal interference or degradation, the present invention is able to overcome or defeat this limitation by functioning in a base form as an intelligent 3-pole switch. That is, the switch only connects the meter's three signal wires to a single meter interrogation unit or MTU at a time and on an as-needed basis.

A conventional meter interrogation unit or MTU will generally interrogate a meter once every 15 minutes or perhaps once every 60 minutes, and an interrogation cycle only lasts approximately 750 milliseconds. Therefore, due to the short interrogation time and long idle periods between interrogations, the automatic meter reading (AMR) signal cable will experience long idle periods with no signal activity. Therefore, the present invention can switch the flow meter to each meter interrogation unit or MTU on demand, with little likelihood of simultaneous contention for the signal lines of the meter.

The present art switch detects communication activity of an automatic meter reading (AMR) compatible flow meter by observing the first clock signal line for signal voltage from a secondary meter interrogation unit. Unlike the prior art, the automatic meter reading (AMR) communication signal may also take the form of a 2-wire, modulated ASK half-duplex communication format, as illustrated in U.S. Pat. No. 6,657,552 with a first line representing a clock/data line and a second line representing a ground line. Such a signal is often utilized in "touch-read" based automatic meter reading (AMR) systems. The presence of this type of signal can also be detected and acted upon by the present invention as it also features a detectable voltage differential between the clock and common (ground) wires.

When a clock or ASK signal is present, the preferably solid state relays or the present art switch allow the two or three AMR lines of the secondary meter interrogation unit or touchpad or touch screen to switch onto or with the lines of the AMR meter. The present art system time constants provide sufficient time in order to allow for the AMR meter reading times. An alternative embodiment of the present art may show meter reading on a display either via the secondary meter interrogation unit such as a SCADAmetrics® EtherMeter® or an integral display on the unit of the present art which is identical to the reading displayed on the water meter register, thereby illustrating that the present invention is functioning properly.

The present art may be manufactured from a plurality of materials and components found within the electronic arts including but not limited to relays (solid state and mechanical), diodes (schottky and PN junction), transistors (field effect and bipolar), resistors, capacitors, inductors, op-amps, optcouplers, liquid crystal displays (LCDs), printed circuit boards (PCBs) and light emitting diodes (LEDs) with the enclosure comprising materials such as steel, aluminum, plastics, composites, woods, and other materials capable of sealing and enclosing the electronic components.

BRIEF DESCRIPTION OF THE DRAWINGS

Numerous other objects, features and advantages of the invention should now become apparent upon a reading of the following detailed description taken in conjunction with the accompanying drawings, in which:

FIG. 15 shows a hookup table for terminal block connector J1 and dip and rotary switch setting tables for the subject of FIG. 14.

FIG. 16 shows a series of meter display unit sample screenshots showing a variety of displays available pursuant to the dip and rotary switch settings as detailed in FIG. 15.

DETAILED DESCRIPTION OF THE INVENTION

Figure 1:
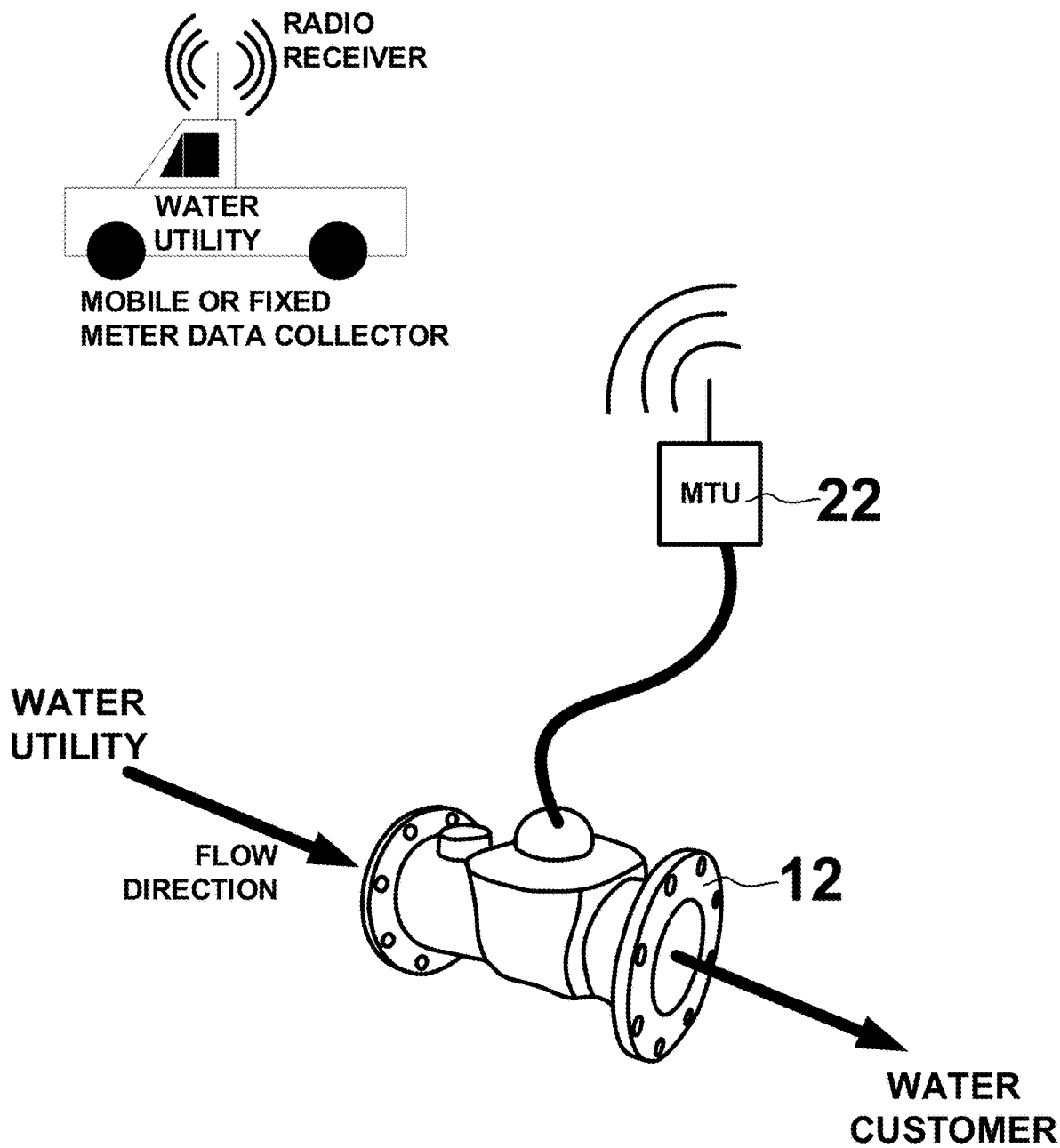
FIG. 1 is a block diagram of a conventional MTU connected with an AMR meter showing a mobile connection radio connection to the MTU.
Figure 2:
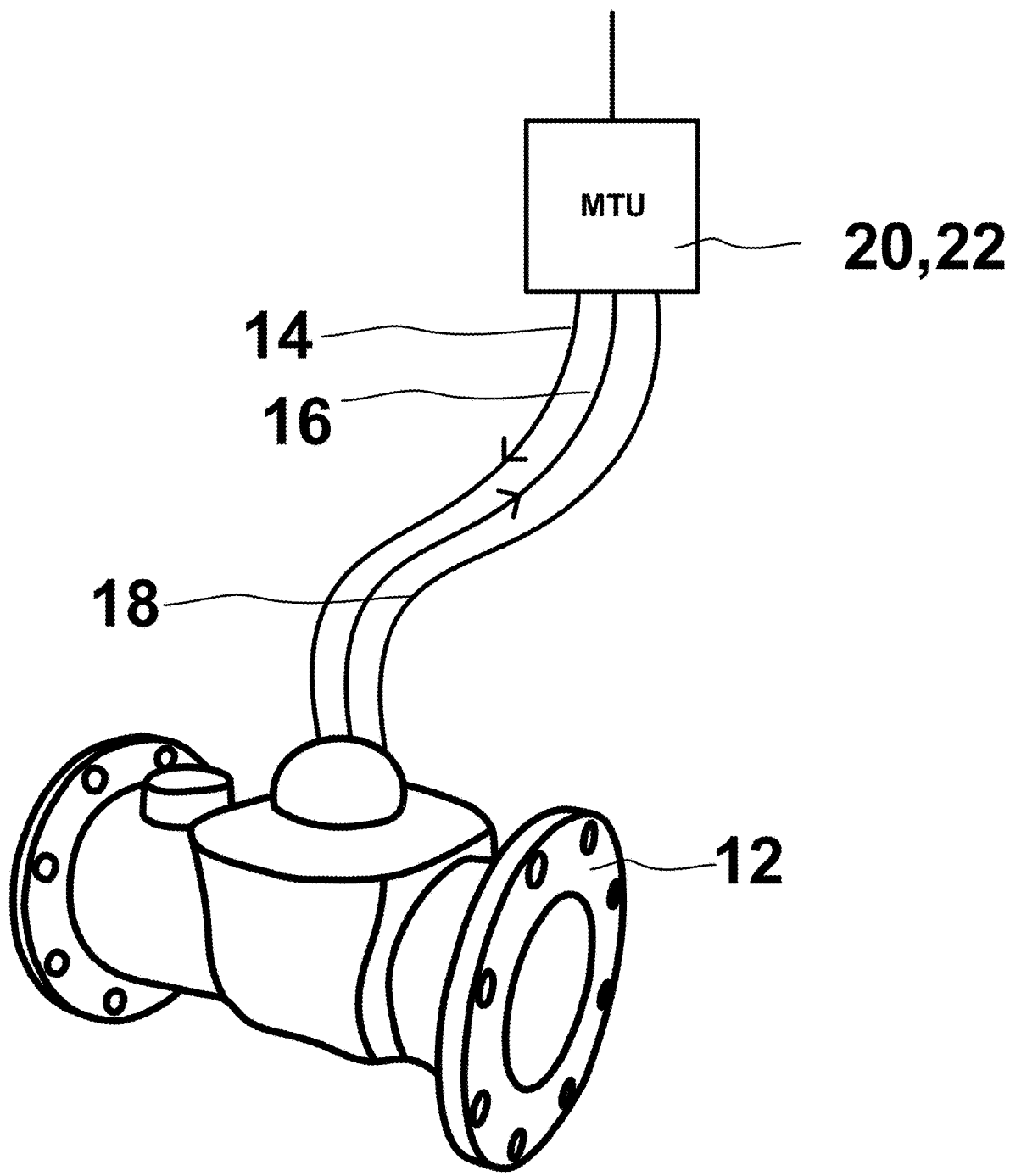
FIG. 2 is a block diagram showing the three wire connection of a conventional meter interrogation unit or MTU with an AMR meter.
Figure 3:
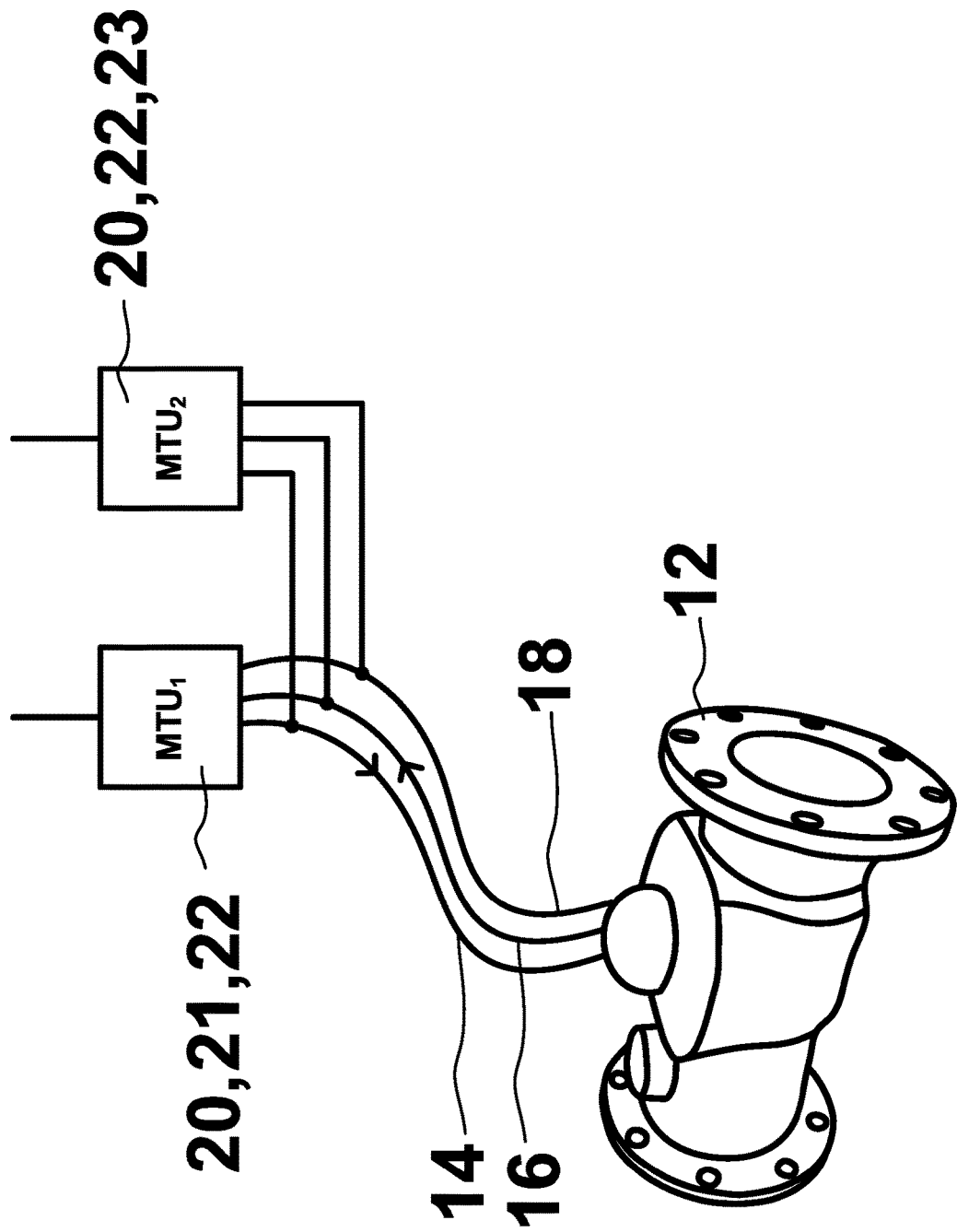
FIG. 3 shows a prior art block diagram attempt at paralleling two meter interrogation units or MTUs which results in nonfunctional or partially functional operation.
Figure 4:
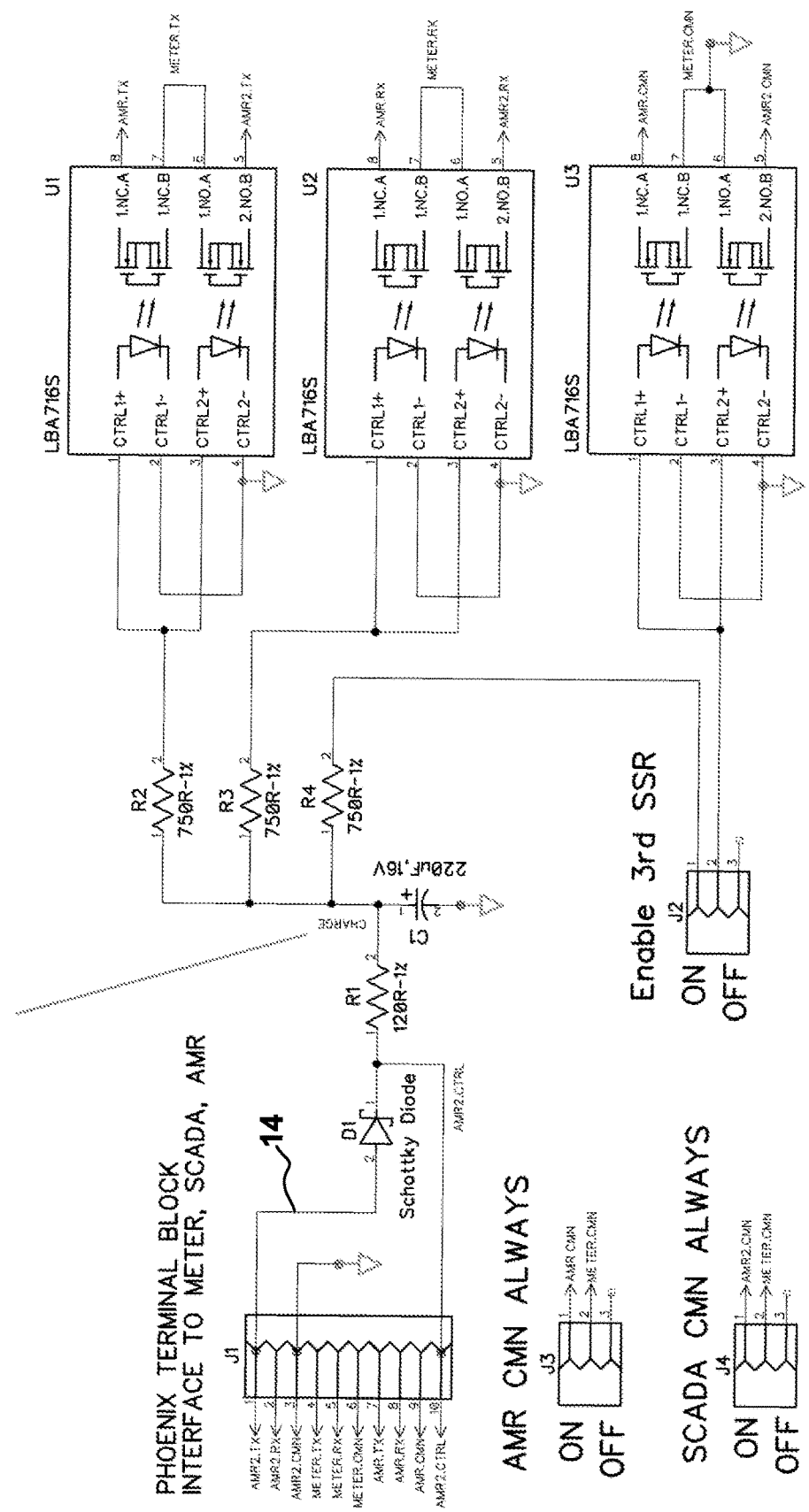
FIG. 4 shows a schematic of another prior art attempt at paralleling two meter interrogation units or MTUs which results in a parasitically powered signal splitter which powers the solid state relays by utilizing a current draw from the secondary meter interrogation clock signal. The parasitic power draw can distort and/or interfere with proper operation.
Figure 5:
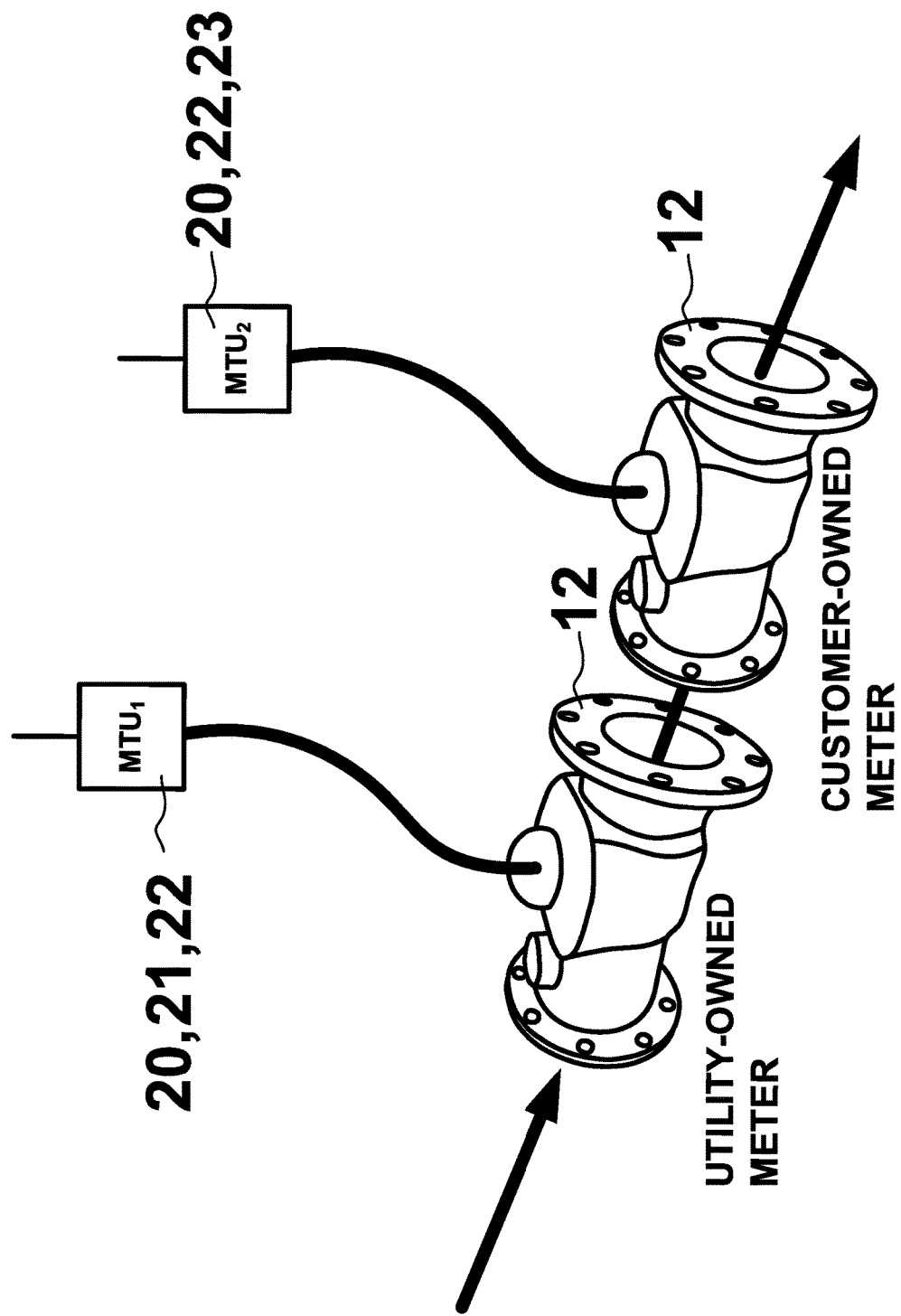
FIG. 5 shows a block diagram of yet another prior art attempt which utilizes two AMR meters.
Figure 6:
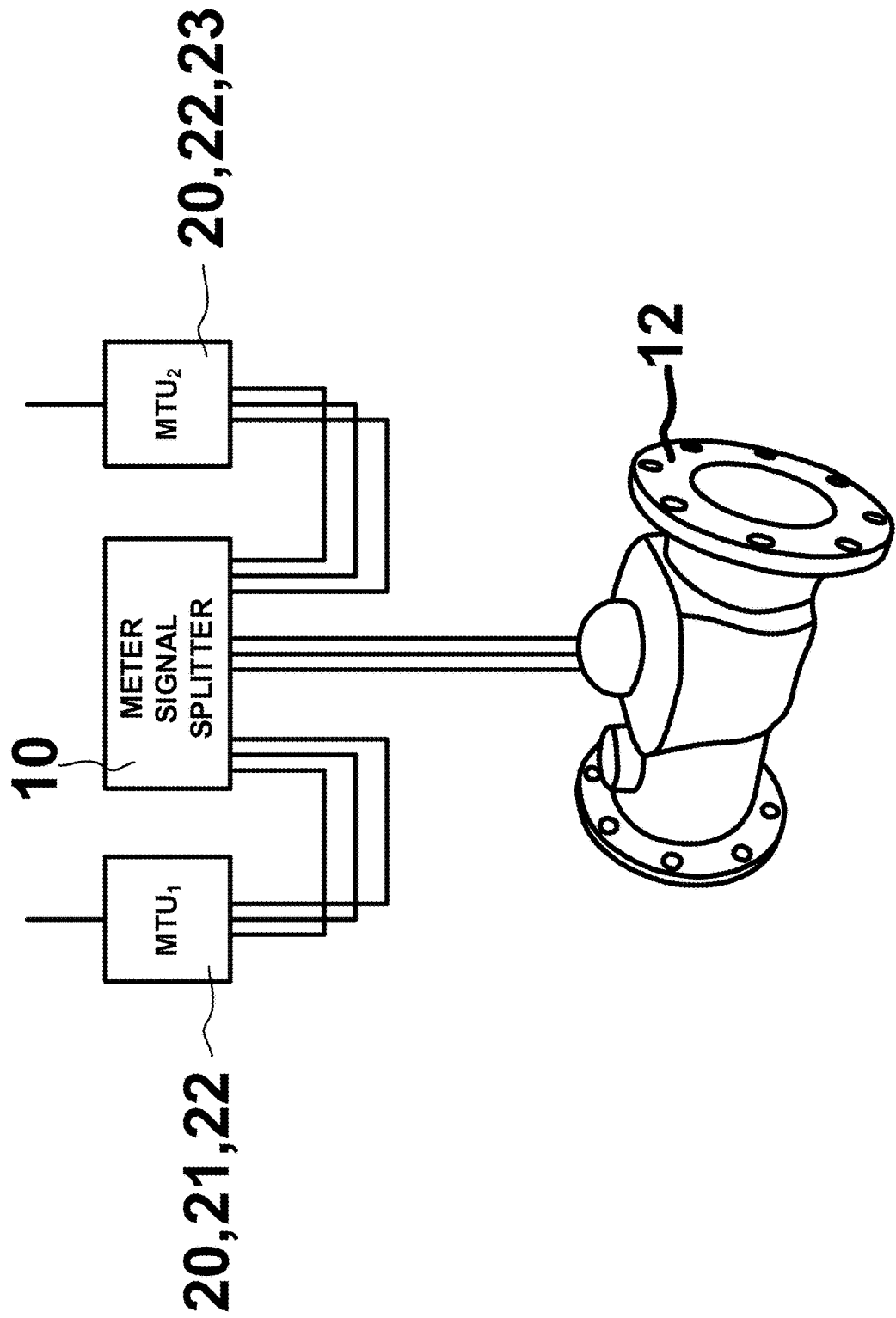
FIG. 6 shows a block diagram of the present art switch interfaced with an AMR meter and a primary and secondary meter interrogation unit or MTU.

Referring now to the drawings, there is shown in FIGS. 6-11 a preferred embodiment and preferred implementation of the signal activated switch for meters equipped with automatic meter reading output capability 10. FIGS. 12-17 show the preferred embodiment in conjunction with a display as an alternate embodiment of the present art. The switch 10 provides an interface for two or more meter interrogation units 20 or meter transmission units (MTUs) 22 to address, interrogate, and read a single automatic meter reading (AMR) meter 12 without interfering with the operation of any of the interrogation units 20, 22 or meters 12 and without parasitic losses, all while using a minimal amount of power.

Because two or more meter interrogation units 20 or meter transmission units (MTUs) 22 cannot be simultaneously connected in parallel to a single AMR meter 12 without signal interference or degradation, the present invention is able to overcome or defeat this limitation by functioning in a base form as an intelligent 3-pole switch. That is, the switch 10 only connects the meter's 12 three signal wires 14, 16, 18 to a single meter interrogation unit 20 or MTU 22 at a time and on an as needed basis. Alternative embodiments may form an equivalent switch 10 having more or less than three poles.

A conventional meter interrogation unit 20 or MTU 22 will generally interrogate a meter once every 15 minutes or perhaps once every 60 minutes and an interrogation cycle only lasts approximately 750 milliseconds. Therefore, due to the short interrogation time and long idle periods between interrogations, the automatic meter reading (AMR) signal cable 14, 16, 18 will experience long idle periods with no signal activity. Therefore, the present invention 10 can switch the flow meter 12 to each meter interrogation unit 20 or MTU 22 on demand, with little likelihood of simultaneous contention for the signal lines 14, 16, 18 of the meter 12.

By way of analogy, the present art 3-pole switch 10 functions similar to a mechanical form-C relay 28, in that it has three normally-closed circuits and three normally-open circuits. The flow meter 12 lines 14, 16, 18 are connected to the "common" analogous relay contacts 32, while a first meter interrogation unit 20 or MTU 22 is connected to the normally-closed contacts 34, and a second meter interrogation unit 20 or MTU 22 is connected to the normally-open contacts 36. For each relay 28 the corresponding lines 14, 16, 18 are matched to the meter 12 lines 14, 16, 18.

Figure 7:
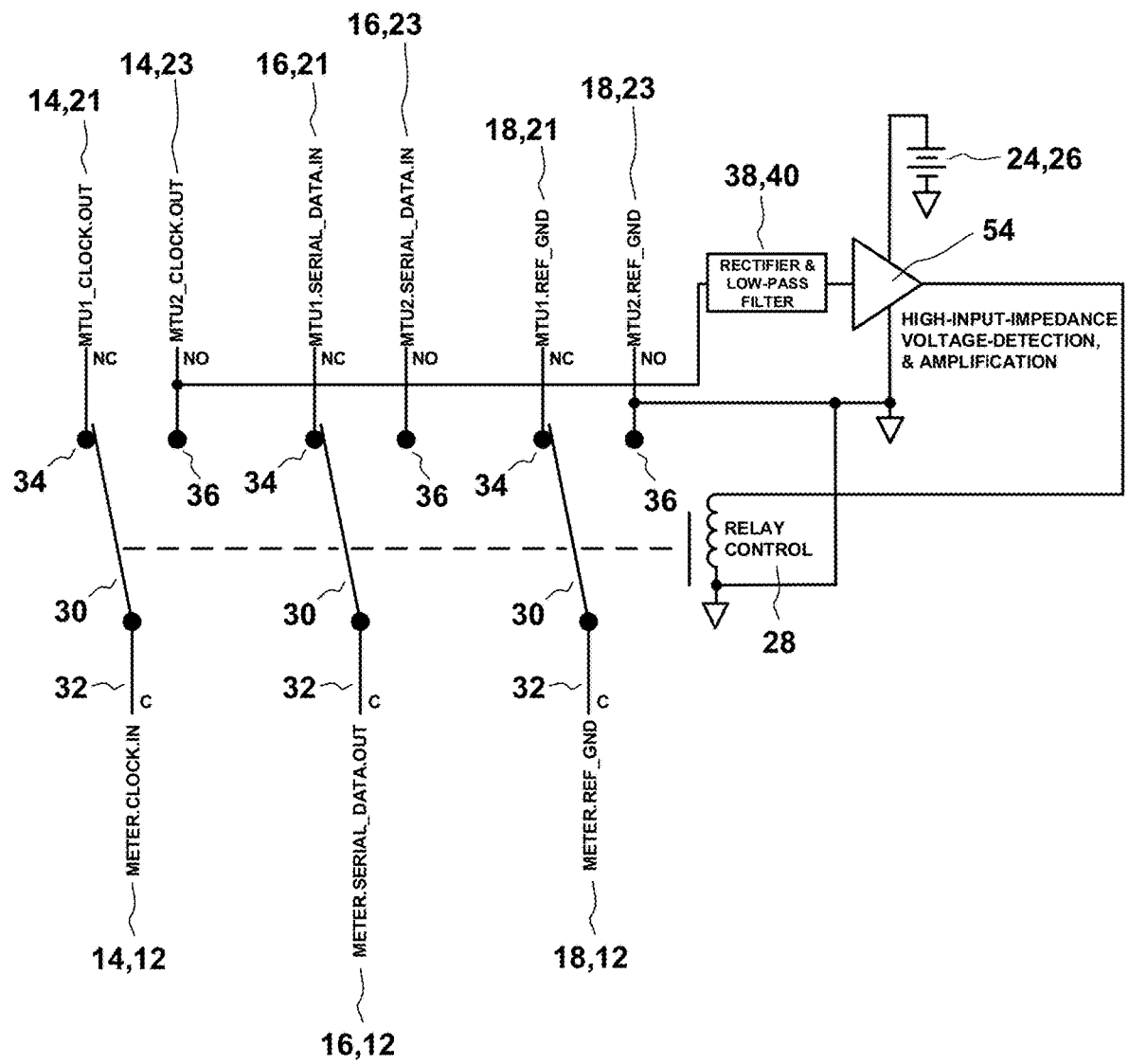
FIG. 7 shows a simplified symbolic schematic of the present art signal activated switch for meters equipped with automatic meter reading output capability. Although the blocks show a mechanical form relay for illustration, the preferred embodiment utilizes a solid state relay.
Figure 8:
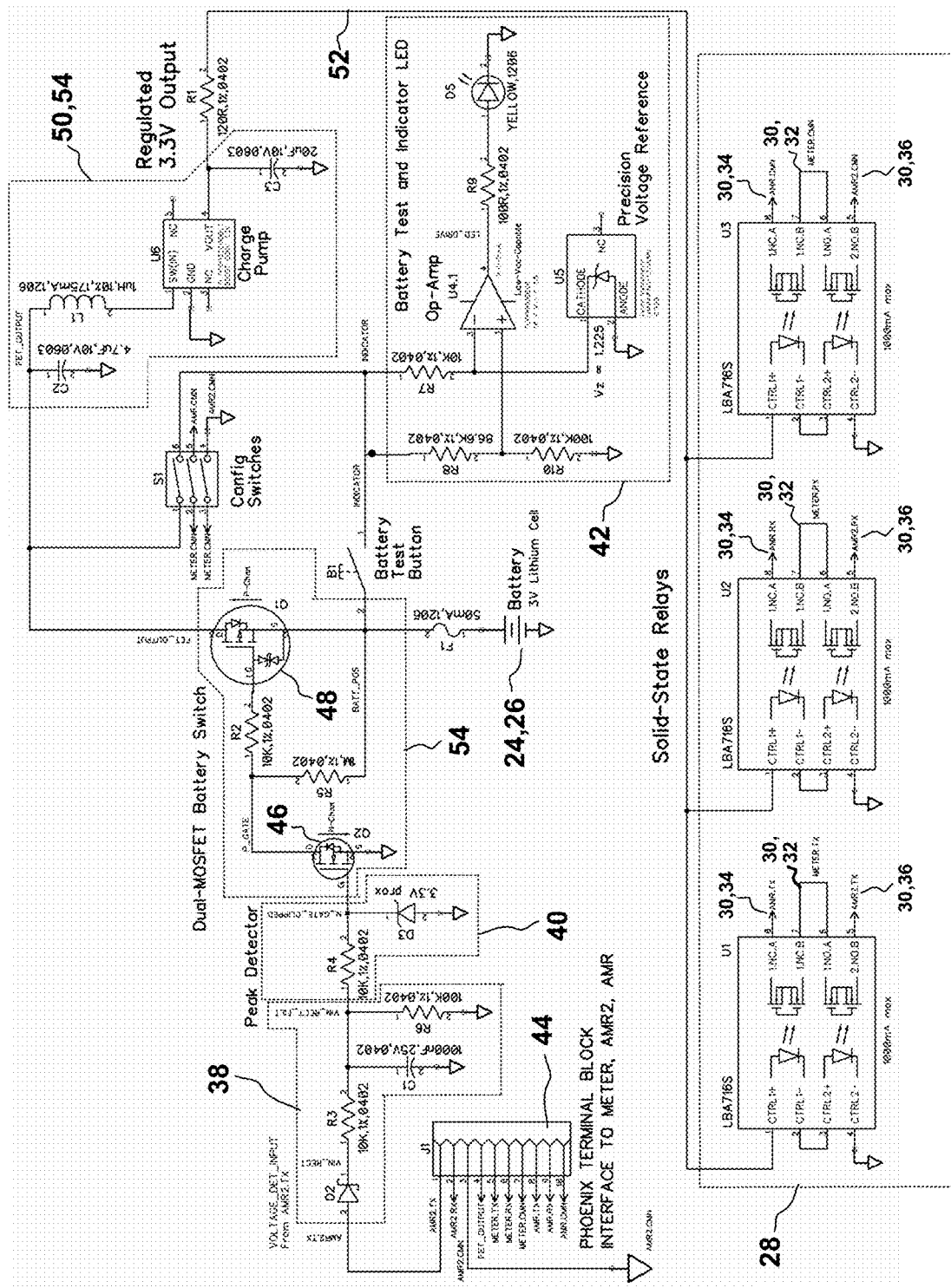
FIG. 8 shows a full schematic of the preferred embodiment of the present art signal activated switch for meters equipped with automatic meter reading output capability.

While the basic architecture of the present invention 10 is conceptually illustrated in the form of a 3-pole, form-C mechanical relay model as shown in FIG. 7, the detailed implementation is illustrated in the schematic of FIG. 8. The present art 10 design is preferably non-mechanical in nature and consists of solid-state components that allow for minimal power consumption.

Figure 9:
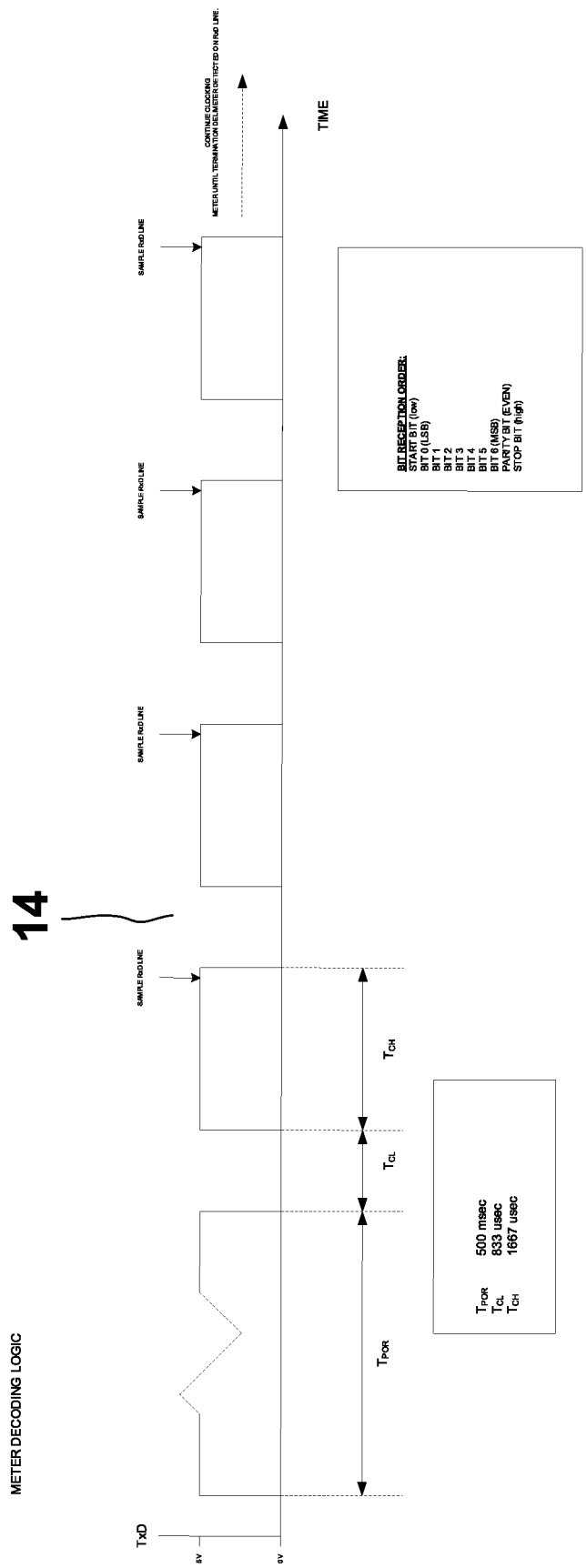
FIG. 9 shows a conventional first clock signal line transmission from a meter interrogation unit or meter transmission unit (MTU).

FIG. 8 illustrates the complete schematic of a preferred embodiment of the present art switch 10. Shown are the details of the circuitry whereby communication activity within the simplex communication cable of an automatic meter reading (AMR) compatible flow meter 12 can be electronically detected by observing the first clock signal line 14 for signal voltage from a secondary meter interrogation unit 23. The nature of the 3-wire automatic meter reading (AMR) clock signal line 14 is illustrated in FIG. 9, whereby it is shown to take the form of a fixed-duration 5 volt pulse, followed by a 0-to-5 volt clock signal with the duration and duty cycle as shown.

The automatic meter reading (AMR) communication signal may also take the form of a 2-wire, modulated ASK half-duplex communication format, as illustrated in U.S. Pat. No. 6,657,552 with a first line representing a clock/data line 14, 16, and a second line representing a ground line 18. Such a signal is often utilized in "touch-read" based automatic meter reading (AMR) systems. The presence of this type of signal can also be detected and acted upon by the present invention 10 as it also features a detectable voltage differential between the clock 14 and common (ground) wires 18.

For the present art 10 preferred embodiment, if the battery 26 or energy storage 24 or power source were to become depleted, the second meter interrogation unit 23 or MTU 22 would no longer be able to interrogate the flow meter 12 until the battery 26 is replaced. However, the normally-closed contacts 34 circuit will continue to allow the first meter interrogation unit 20 or MTU 22 to function, even in the presence of a depleted battery. For this reason, the dominant entity, usually the water utility or the owner of the water meter 12, would generally install their meter interrogation unit 20 or MTU 22 at the normally closed contacts 34.

For the preferred embodiment of the present art switch 10 as shown schematically in FIG. 8, the trigger or activation signal comprises the first clock signal line 14 from a second or secondary meter interrogation unit 23, 20 or MTU 22 as seen on pin 1 of connector J1 44. As shown, all clock signal lines 14, data signal lines 16, and ground lines 18 from the primary meter interrogation unit 21, the AMR meter 12, and the secondary meter interrogation unit 23 interface with the switch 10 at connector J1 44. As stated, the primary meter interrogation unit 21 always flows through the switch 10 to the AMR meter 12 if no signal is present on pin 1 of connector J1 44 or if the energy storage device 24 or battery 26 is depleted. When a clock signal 14, similar to or such as shown in FIG. 9, is present at pin 1 of connector J1 44, the relays 28 switch to allow the three AMR lines 14, 16, 18 of the secondary meter interrogation unit 23 to switch onto or with the lines of the AMR meter 12.

In operation, the clock signal 14 is first introduced into a peak detector 38 with a clamp circuit 40 which limits the potential value output to about 3.3 volts via the action of zener diode D3. The peak detector 38 with a clamp circuit 40 can also be described as a rectifier and low pass filter circuit as understood by those of ordinary skill within the art. The peak detector 38, in a preferred embodiment, utilizes a schottky diode D2 in series with a resistor R3 and a storage capacitor C1 thereafter in parallel. The time constant $\tau_1$ of the combination R3, C1 as shown is approximately 10 milliseconds which assures that the stored charge on C1 will not decay significantly when presented with the successive pulses from the signal 14 as shown and described in FIG. 9. When no signal is present at pin 1 of connector J1 44, the charge of C1 decays via R6 with a time constant $\tau_2$ of approximately 0.1 second. Alternative embodiments may utilize a plurality of $\tau_1$, $\tau_2$ time constants provided they allow recognition of the signal present on pin 1 of connector J1 44 and allow for the AMR meter 12 reading times.

For the preferred embodiment, the output of the clamp circuit 40 drives the gate of an enhancement mode N-channel mosfet Q2 46 which has an approximate turn on voltage of 0.7 volt. When Q2 46 turns on, the drain of Q2 46 pulls the gate of Q1 48 low or near ground through R2. As Q1 48 is a P-channel enhancement mode mosfet device, when the gate terminal of Q1 48 is pulled lower than the source terminal of Q1 48, Q1 48 conducts current from the source to drain and raises the voltage on the charge pump U6 50 which thereby provides a regulated approximately 3.3 volt output onto the control lines 52 of the solid state relays 28. Once applied to said control lines 52, the three relays 28 switch the AMR meter 12 lines 14, 16, 18 onto or with the respective lines 14, 16, 18 of the secondary meter interrogation unit 23 and thereby allow communication of the meter 12 with the secondary meter interrogation unit 23. When the clock signal 14 is removed at pin 1 of connector J1 44 and after several time constants $\tau_2$ of the C1, R6 peak detector circuit 38, the relays 28 revert to the default status of communication of the meter 12 with the primary meter interrogation unit 21. The combination of mosfets 46, 48 and charge pump 50 as shown and described can be described or understood as a high input impedance voltage detection, amplification, and driver circuit 54 yet said voltage detection, amplification, and driver circuit 54 may operate without a charge pump 50. The charge pump 50 assures proper turn on voltage levels for the relays 28.

Although not necessary for communication, when Q1 48 conducts current from the source to drain it also, when switch Si is selected on, drives an op amp comparator circuit 42 which illuminates an LED D5. The LED D5 verifies communication for the end user. As described, the relays 28 are preferably solid state relays in order to minimize power consumption yet may be traditional mechanical relays for alternative embodiments when power consumption is of little concern.

Figure 10:
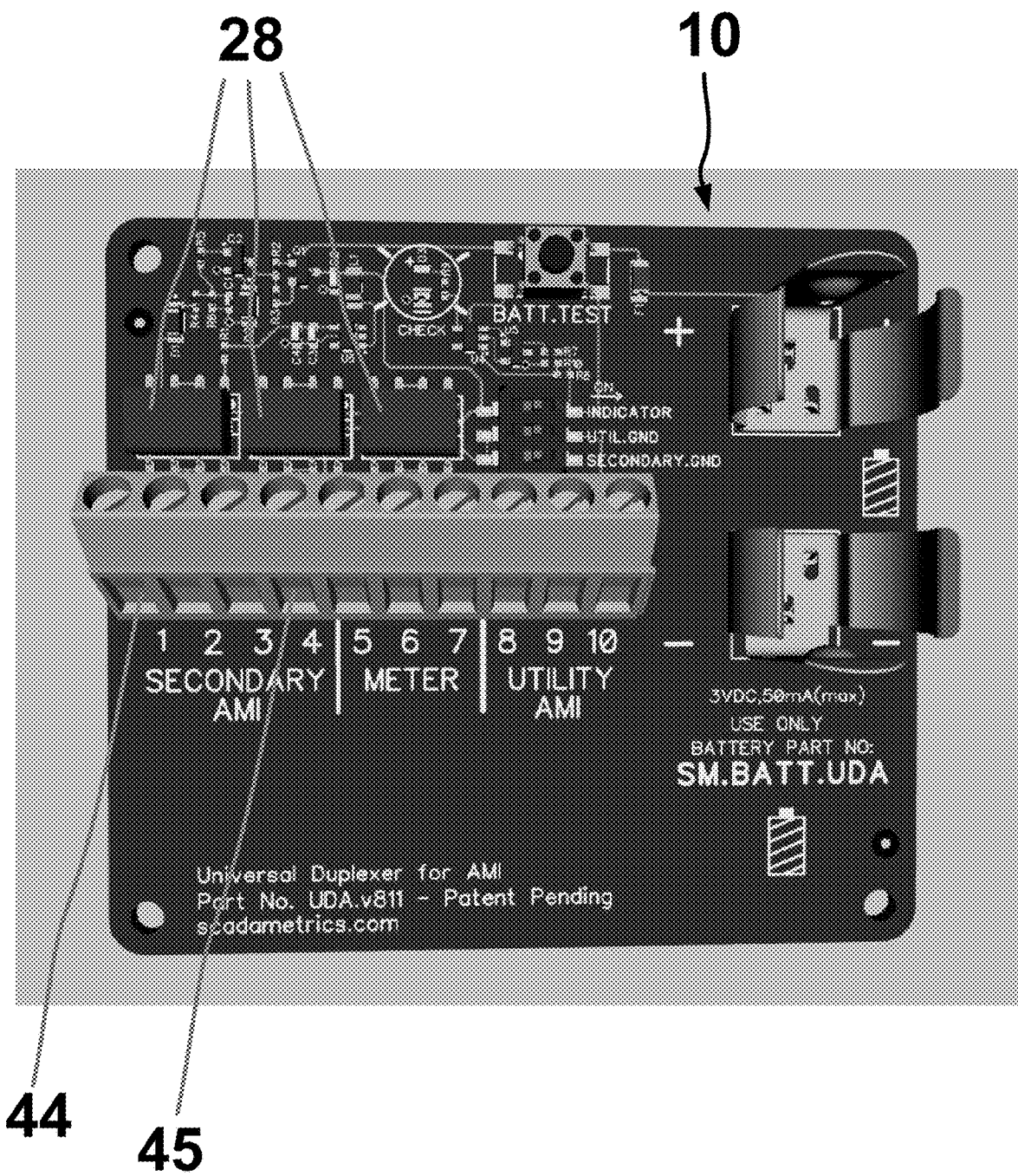
FIG. 10 shows a three dimensional computer aided design image of the present art circuit implementation of FIG. 8 which utilizes the AMI term as a synonym for AMR.

The printed circuit board of the present invention 10, which was shown and described in the schematic of FIG. 8 is 3-dimensionally illustrated in FIG. 10. The printed circuit board would ideally be installed within a weatherproof enclosure, with weatherproof cable entry via compressive cable glands.

Figure 11:
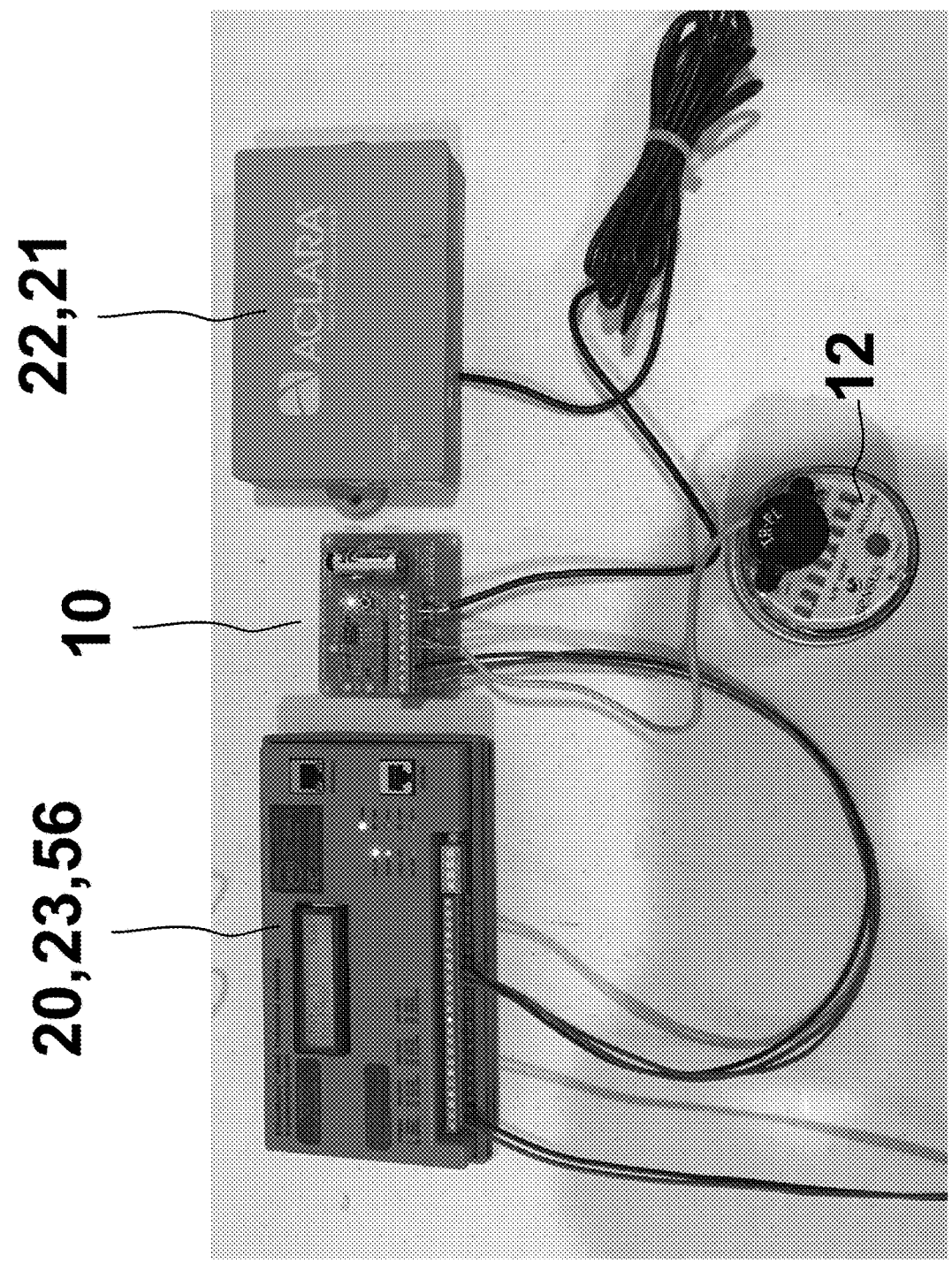
FIG. 11 shows a black and white photograph of the present art switch interfaced with a secondary meter interrogation unit, a primary meter transmission unit (MTU), and an automatic meter reading (AMR) meter.
Figure 12:
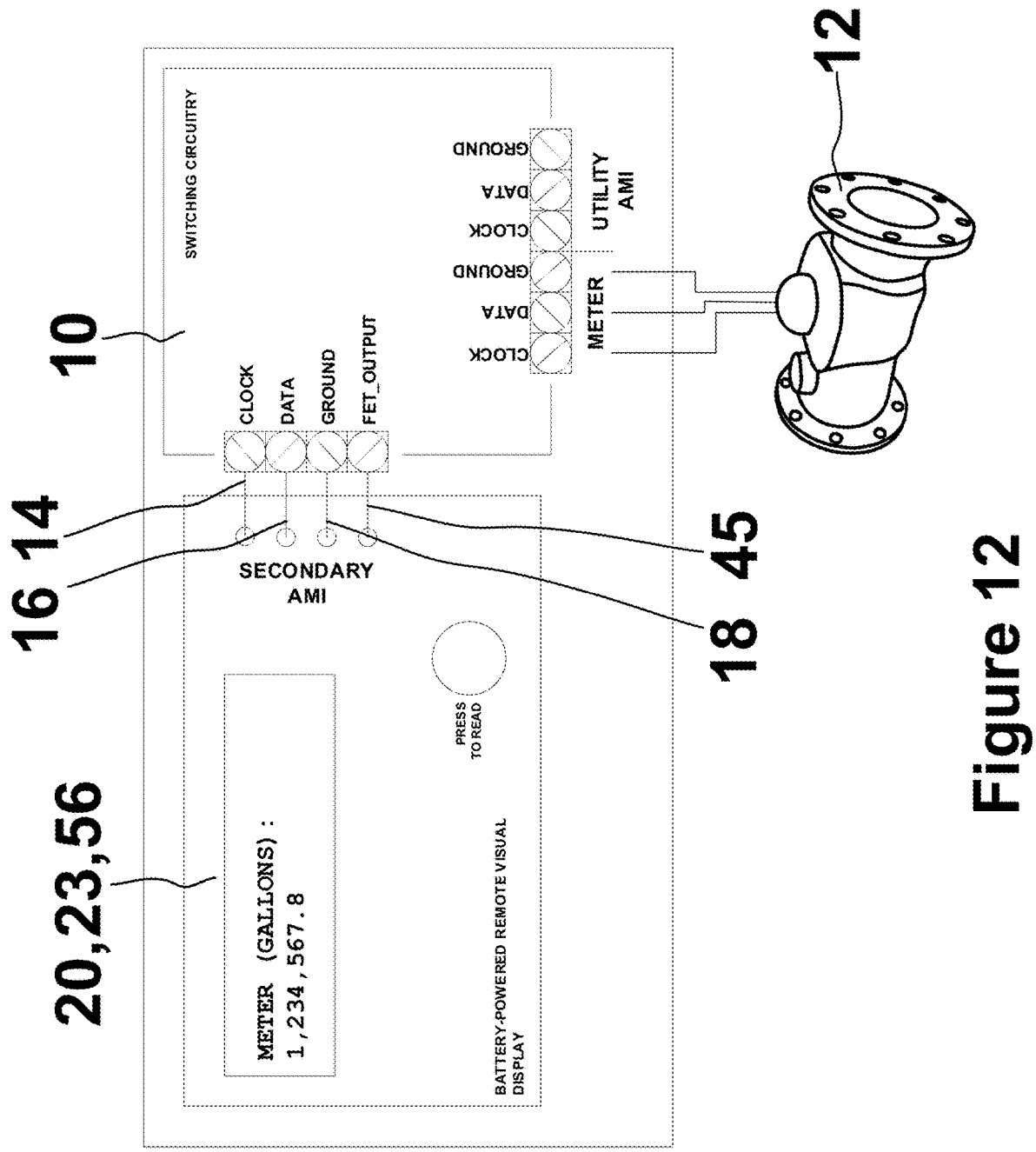
FIG. 12 shows a block diagram of an embodiment of the present art switch which includes a meter display unit, embodied as a combination instrument of an automatic meter reading (AMR) signal switch and a remote visual display in which a fourth FET_OUTPUT line (drain line of enumerated FET 48 of FIG. 8) is utilized to initiate a read of the AMR meter via placement of a +5 volt signal on said FET_OUTPUT line via said remote visual display or meter display unit.
Figure 13:
FIG. 13 shows a photograph of the external view of an embodiment of the present art switch which includes a meter display unit, embodied as a combination instrument of an AMR signal switch and visual display.

A preferred utilization of the present art switch 10 is illustrated photographically in FIG. 11, which shows a primary meter interrogation unit 21 as a meter transmission unit (MTU) 22, a secondary meter interrogation unit 23 as a meter interrogation unit 20 which are both connected through the present art switch 10 to to a single Sensus automatic meter reading (AMR) encoder-type water meter register 12. As shown, the secondary meter interrogation unit 23 is a SCADAmetrics® EtherMeter®, and primary meter interrogation unit 21 is an Aclara MTU 22. In FIG. 11, the water meter reading displayed on secondary meter interrogation unit 23 is identical to the reading displayed on the water meter register 12, thereby illustrating that the present invention 10 is functioning properly.

The preferred embodiment of the present art 10 would include a weatherproof enclosure, so as to allow outdoor mounting. The preferred embodiment of the present art 10 would also include cable glands with integral compression seals to prevent water ingress at the cable entry points.

With the increasing prevalence of automatic meter reading systems, there is a growing need to share the data from a flow meter 12 among multiple interested parties via meter interrogation units 20 and/or meter transmission units (MTU) 22. Examples include but are not limited to a metering station between two water utilities. Often, one water utility sells bulk water to a neighboring water utility. Regulatory reporting requirements may include the collection and filing of daily readings by both the seller and the buyer. Enabled by the present invention 10, both utilities would be able to read the meter 12 remotely using each's own wireless MTU 22, thereby achieving substantial savings in time, energy, and wages.

Also, most water meters 12 are installed within underground vaults in order to prevent pipeline freeze damage. Therefore, in the absence of the present invention 10, only one water utility could read the meter with a wireless MTU 22, while the other would be required to send an employee down into the underground vault to take a visual reading from the meter 12. As this is a confined space, it poses a potential human safety risk, in addition to a time and expense issue.

As described, another object and benefit of the present invention 10 is to allow a single meter 12 to be shared by an MTU 22 and a meter display unit 56. A meter display unit 56 is simply a meter interrogation unit 20 with a display 56 which indicates the flow volume or totalization. In this scenario, one entity could read an MTU 22 using a wireless data collector, while the other entity could read the meter 12 visually using a meter display unit 56. The meter display unit 56 could be installed above-ground, alleviating the need to climb into the confined space of an underground vault, thereby reducing risk to personnel as well as saving time, energy, and wages.

Another object and benefit of the present invention 10 is the ability to connect both the utility's automatic meter reading (AMR) system and the utility's supervisory control and data acquisition (SCADA) system to a single flow meter 12. One such example would be the connection of a meter 12 to an MTU 22 which transmits the meter 12 reading for billing purposes, while also allowing simultaneous connection to a SCADA interrogation device, such as a SCADAmetrics® EtherMeter®. A SCADA interrogation is simply a meter interrogation unit 20 which transmits flow volume data in a form which is readable by SCADA system. The SCADA device would generally be used to transmit realtime flow rates and totalization data into the utility's control system in order to monitor for the correct performance of pumps and valves, and to monitor for leaks. Some flow meters 12 offer dual signal outputs for this purpose, although they are generally in the form an automatic meter reading (AMR) signal 14, 16, 18 for connection to a meter interrogation unit 20 or MTU 22 plus a one pulse-per-volume signal for connection to a SCADA system. Because the automatic meter reading (AMR) signal 14, 16, 18 offers accuracy advantages over the pulse signal, a connected SCADA system would generally prefer to receive the more accurate metering data that could be acquired by sharing the automatic meter reading (AMR) signal 14, 16, 18.

Another object and benefit of the present invention 10 is the ability to connect the flow meter to the utility's automatic meter reading (AMR) system and the customer's utility monitoring system. Many customers, especially commercial properties and factories, engage in significant energy conservation efforts aimed toward reducing the usage (and especially waste) of water, natural gas, and electricity. The ability to track each of the billed utility meters 12 plays an important role in this effort and the present invention allows for both the utility and the customer to read the same meter 12.

It is also possible that three or more entities would occasionally wish to automatically read a single flow meter 12. The present invention 10 can be utilized to recursively split the meter 12 signal lines 14, 16, 18. For example, the secondary meter interrogation unit 23 output of a first present art switch 10 could input into the meter terminals 14, 16, 18 of a second present art switch 10, thereby achieving sharing among three meter interrogation unit 20 or MTU 22 devices. A fourth meter interrogation unit 20 or MTU 22 could also be connected with the meter 12 with the addition of a third present art switch 10. Adding further present art switches 10 will allow as many connections as the user desires.

Figure 14:
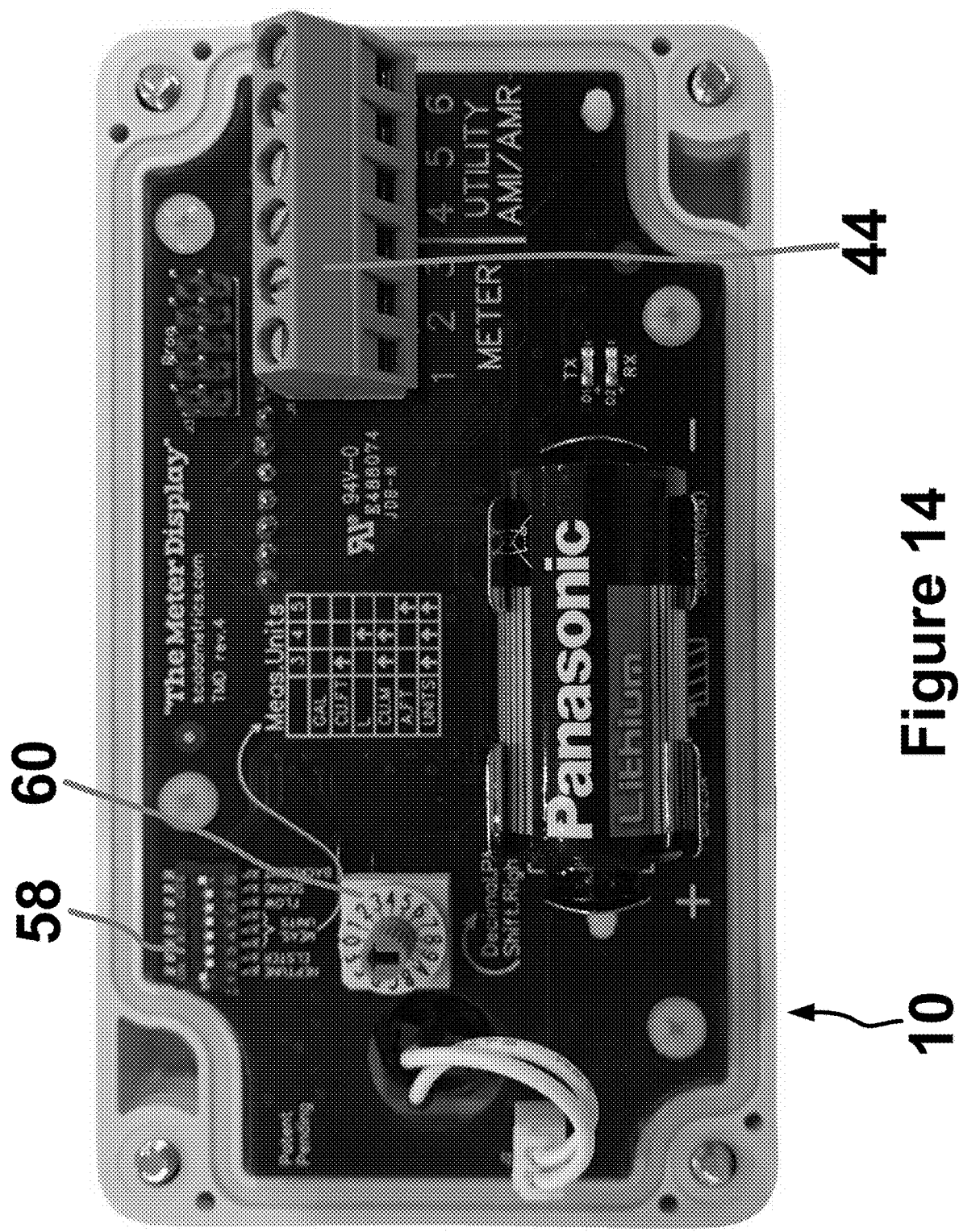
FIG. 14 shows a photograph of the internal view of the subject of FIG. 13 showing terminal block connector J1 and dip and rotary control switches.
Figure 17:
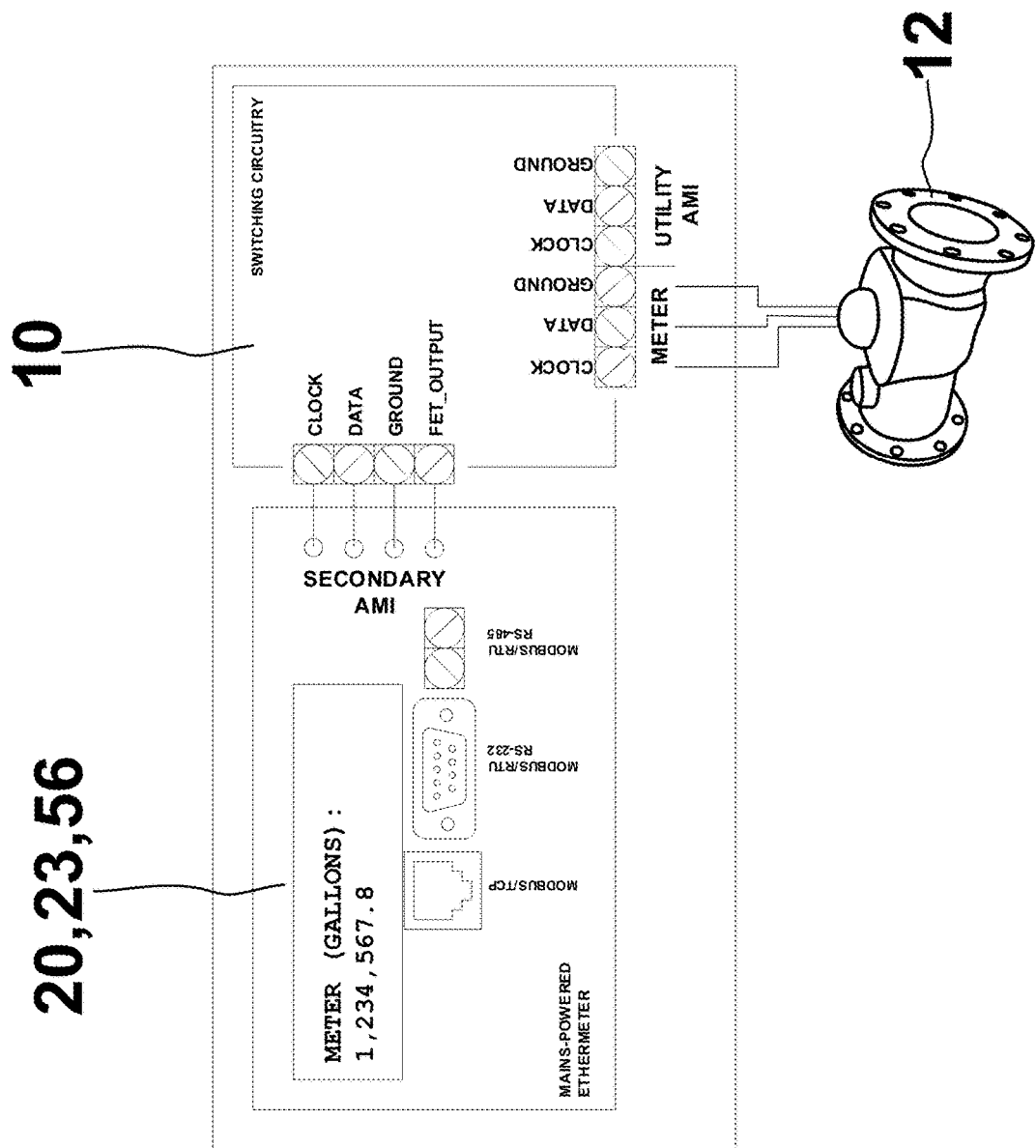
FIG. 17 shows a block diagram of the present invention interfaced with an industry recognized EtherMeter® from SCADAmetrics® in which a fourth FET_OUTPUT line (drain line of enumerated FET 48 of FIG. 8) is utilized to initiate a read of the AMR meter via placement of a +5 volt signal on said FET_OUTPUT line from said EtherMeter® with said EtherMeter® serving as a remote visual display.

As shown in FIGS. 14 and 15, the meter display unit 56 of the present art allows the user to select a display of meter brand type, units (gallons, feet$^3$, liters, meter$^3$, acrefeet, or raw data), approximate rate of flow measured in 30 second averaged intervals, AMR meter 12 identification number, and meter display 56 backlight, via dip switch 58 as well as a multiplier for raw data via rotary switch 60 in order that the meter display unit 56 displays the proper totalization. The ASCII data from each AMR meter is unique to the meter brand and each meter is also rated for and supplies ASCII data in unique and dedicated units (i.e. gallons, feet$^3$, liters, etc.) as originally ordered. The meter display unit 56 has an integral microcontroller 62 that reads the settings of said switches 58, 60 and provides the display 56 with proper readings relative to said AMR meter 12 raw signals 14, 16, 18. Effectively, the meter display unit 56 provides a similar function as a secondary meter interrogation unit 23 when said secondary meter interrogation unit 23 has an integral display such as the EtherMeter® from SCADAmetrics®.

As shown in FIGS. 8, 10, 12, 14, and 17, the FET_OUTPUT signal line 45 at the drain of Q1 48 of the present art is made available to the J1 terminal block connector 44 at pin 4 in order that a secondary AMR device can provide a 5 volt control signal on a fourth wire. Provision of said 5 volt signal obviates the need for the peak detection circuitry 38 and also provides actuation power to the three (3) solid-state switches or relays 28 which eliminates the need for battery 26 power. A 4-wire output interface is integral to some MTU devices such as the EtherMeter® from SCADAmetrics® which also provides the meter display unit 56.

A first alternative embodiment of the present art may utilize two relays 28 instead of three when incorporating the meter display unit 56. For two relay 28 operation the meter third ground line 18 is commonly or substantially connected with the primary and secondary meter interrogation unit 21, 23 third ground line without utilizing a third relay 28. As the first alternative embodiment is isolated from earth ground, ground loop issues are not present. The voltage detection, amplification, and driver circuit 54 remains substantially the same as the preferred embodiment with the feed to the enhancement mode N-channel mosfet 46 driven by the microcontroller 62 through a resistor bleed network instead of the peak detector 38. That is, when the user desires to illuminate the display 56 and provide totalization or other data (as requested by switches 58, 60) and pushes or activates the push button or activation switch 64, the charge pump 50 is energized via the energy storage device 24, supplies power to the microcontroller 62 and the microcontroller 62 places a high signal on the maintain line feeding the voltage detection, amplification, and driver circuit 54 and gate of the enhancement mode N-channel mosfet 46 until such time as the microcontroller 62 places a low value and turns off the entire circuit.

The two relays 28 have the same switching relay contacts 30, common contacts 32, normally closed contacts 34, and normally open contacts 36 as the preferred embodiment with the normally open contacts 36 for the secondary meter interrogation unit 23 first clock signal line and secondary meter interrogation unit 23 second data signal line being fed into separate inputs on the microcontroller 62. The first alternative embodiment drives the relay 28 control lines 52 with the microcontroller 62. The microcontroller 62 generates or writes the first clock signal line 14 and reads the second data signal line 16 and drives the meter display unit 56 which has the form of a liquid crystal display in the first alternative embodiment yet may be light emitting diodes, organic light emitting diodes, or graphic displays in further alternative embodiments.

Figure 18:
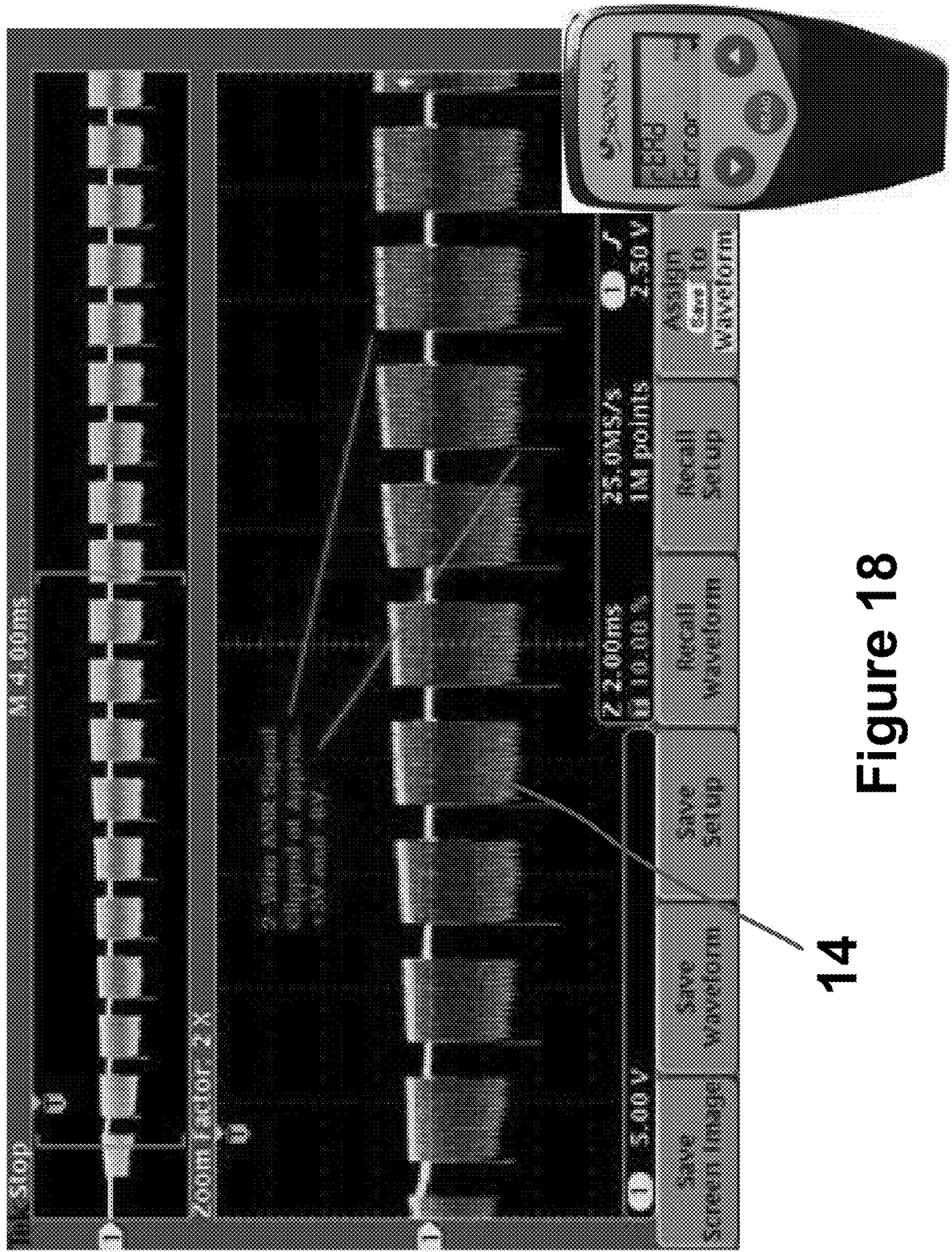
FIG. 18 illustrates the distortion introduced by a prior art switch when interfaced with a 2-wire AMR data signal as measured at a Sensus water meter, using a Tektronix DPO3012 digital storage oscilloscope with a 5 volt per division resolution. The signal was acquired at the water meter Red (Clock) 14 and Black (Ground) 18 terminals. The measured signal is downstream of a Mueller Tru-Read's buffered AMR output signal port with the parasitically-powered buffer causing signal distortion, as illustrated by signal clipping at +5V and −8V, which results in a meter-read-failure when using a 2-wire Sensus Pocket-Reader shown at the lower right insert. The undistorted signal should reach approximately +15V and −15V.
Figure 19:
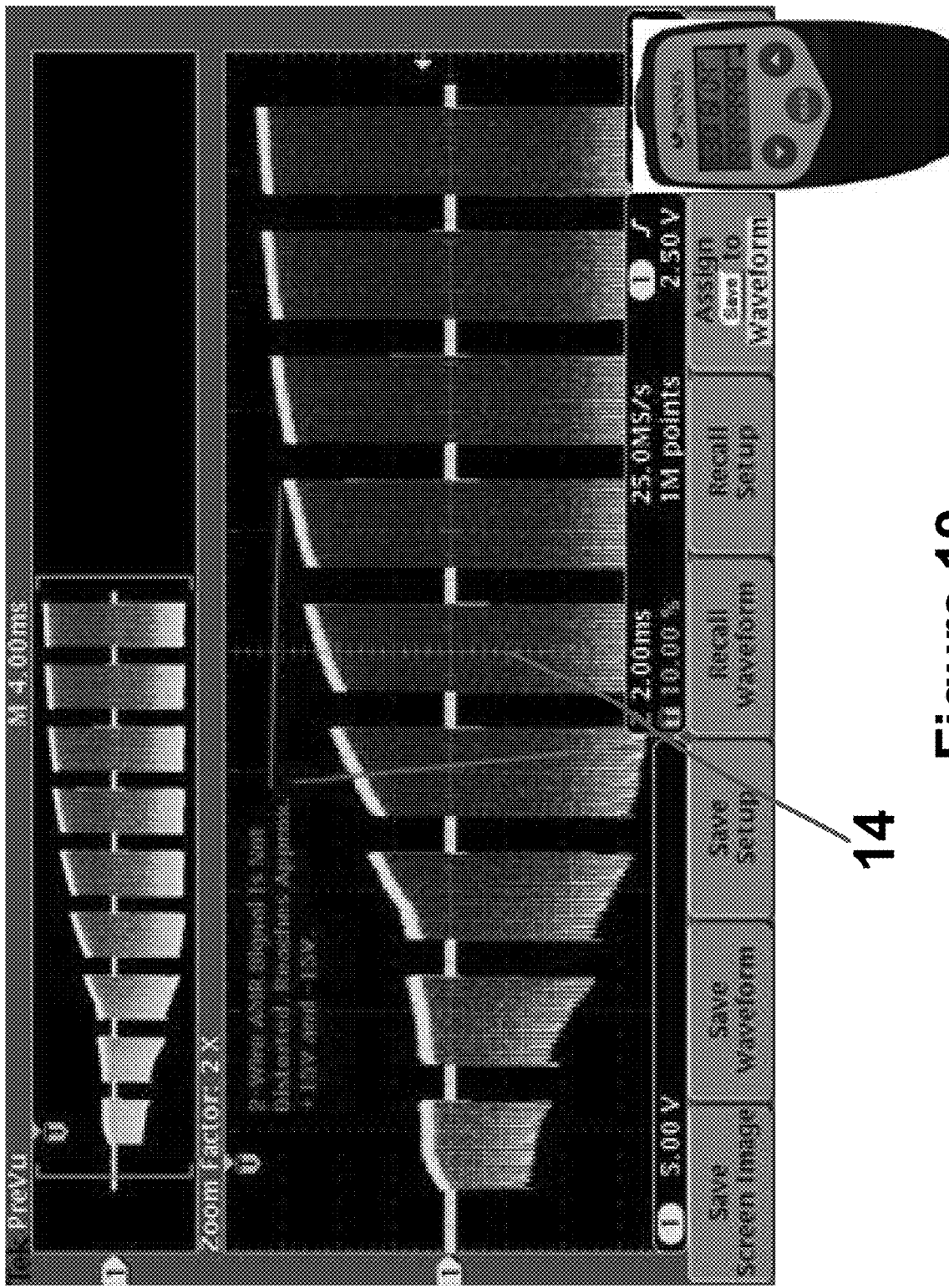
FIG. 19 illustrates the present art measured 2-wire AMR data signal, as measured at a Sensus water meter, using a Tektronix DP03012 digital storage oscilloscope with a 5 volt per division resolution. The signal was acquired at the water meter Red (Clock) 14 and Black (Ground) 18 terminals. The measured signal is downstream of the present invention's MTU1 port (primary AMR port), where the present invention is either non-powered (3V lithium battery cell is removed) or powered (3V lithium battery cell installed). The signal is non-distorted, and achieves +15V and −15V, resulting in a successful read when using a 2-wire Sensus Pocket-Reader shown at the lower right insert. The signal is non-distorted because there are no prior art parasitic losses, even in a worst-case-scenario with the battery removed.
Figure 20:
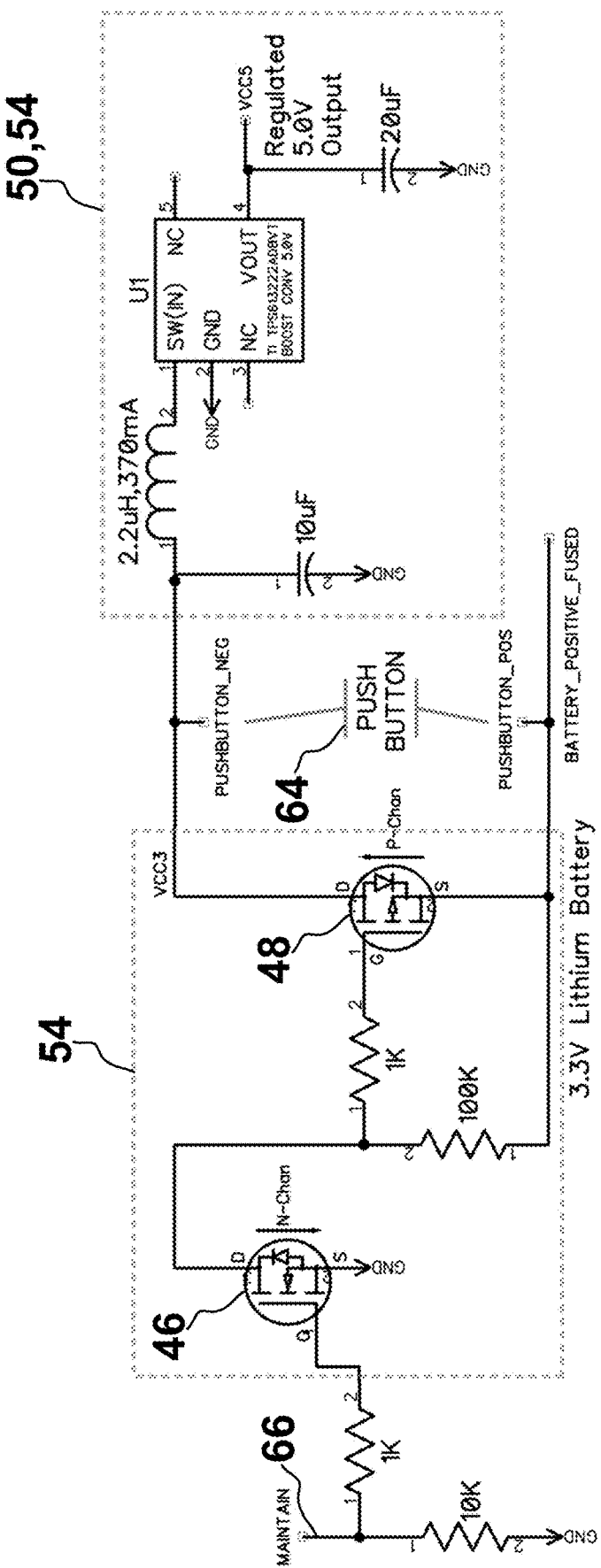
FIG. 20 shows a first page schematic of an alternative embodiment of the present art having a meter display unit with a push button on and which utilizes two relays instead of three. The subject of this first page schematic is the power supply utilized by the microcontroller and the circuit as a whole.
Figure 21:
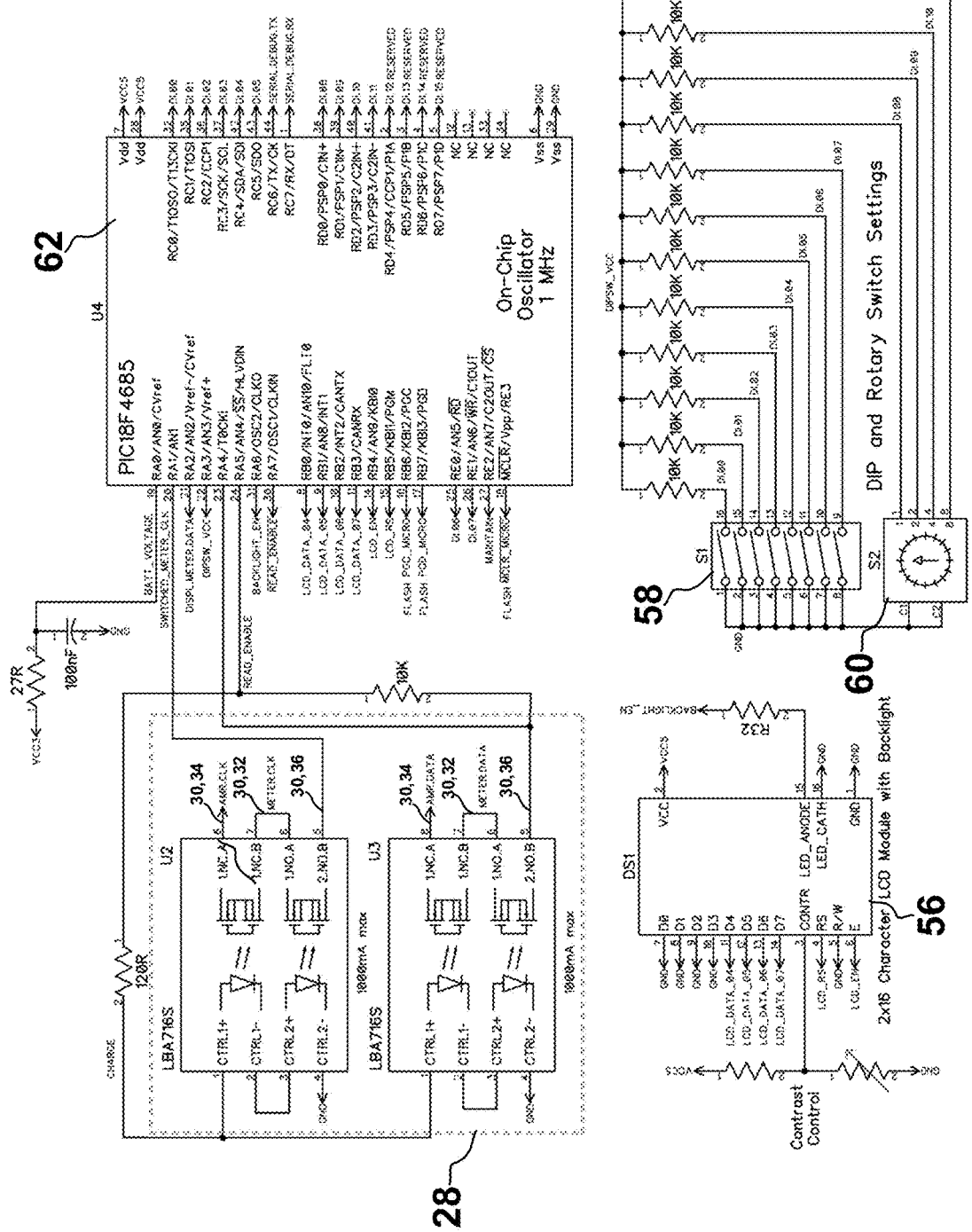
FIG. 21 shows a second page schematic of the alternative embodiment of FIG. 20 having a meter display unit with a push button on and which utilizes two relays instead of three.

The presence of the non-buffered normally closed contact circuitry 34 with zero or near zero impedance is in distinct contrast relative to the prior art. Without the present art normally closed relay 28 or switching contacts 34, the dominant entity, i.e. the utility company, would not allow the installation of a signal splitting device or switch as battery depletion or loss of power would cause a loss of meter signal 14, 16, 18. Furthermore, the prior art switching devices that consist of parasitically powered and buffered metering signals result in unacceptable meter signal distortion, as illustrated in FIG. 18. As illustrated in FIG. 19 and described, the present art invention does not allow signal distortion, even when the battery is removed.

From the foregoing description, a plurality of benefits and objects of the invention are realized from the present art 10. From the foregoing description, those skilled in the art will appreciate that a signal activated switch for meters equipped with automatic meter reading output capability 10 has been shown and described. The present art allows the split of an automatic meter reading (AMR) encoded register 12 signals 14, 16, 18 into two or more meter interrogation units 20 or MTU 22 reading devices without significantly affecting the integrity of the signals 14, 16, 18. Such a device heretofore has not been available.

The present art reduces the time, human risk, and energy-consuming process of visually reading meters 12 by allowing for the addition of more automatic meter reading devices 20, 22 to a single flow meter 12. Having described the invention in detail, those skilled in the art will appreciate that all the objects of the present invention 10 are realized and that modifications may be made to the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A signal activated switch, for reading a meter with automated reading capability, using two interrogation units, comprising:
    a connector connected to a first signal line of the meter for receiving a clock signal, a data signal line of the meter for receiving a data signal and a ground line of the meter for receiving a ground reference wherein the meter is a fluid or a gas meter;
    a first solid state relay, a second solid state relay and a third solid state relay wherein each relay has an input terminal connected to the connector for receiving the clock signal, the data signal and the ground reference and wherein each relay has a first and a second output terminal wherein the first output terminals of the each relay is connected to the inputs of a primary interrogation unit and the second output terminal of each relay is connected to the inputs of the secondary meter interrogation units respectively;
    a peak detector circuit including a voltage detector, an amplifier, and a drive circuit wherein the peak detector receives a clock signal from the second interrogation unit when meter data is requested by the second interrogation unit wherein the peak detector detects the clock signal from the second interrogation unit to produce a drive signal that is input into the first, second, and third relay control input to cause the relays to connect the input terminals to the second output terminals of each of the relays and wherein the input terminals of the relays are connected to the first output terminals of the first, second, and third relays when there is an absence of the drive signal.

2. The signal activated switch, for reading a meter with automated reading capability, using two interrogation units in claim 1, further comprising:
    a meter display unit connected to the clock signal and the data signal and the ground of the second output terminals; wherein the meter display unit displays a totalization of the meter or the flow rate of the meter.

3. The signal activated switch, for reading a meter with automated reading capability, using two interrogation units in claim 1, further comprising:
    an energy storage device for powering said voltage detection, amplification, and driver circuit wherein the input terminal of the relays are connected to the first output terminal of the first, second, and third relays when the energy storage device is depleted.

4. The signal activated switch, for reading a meter with automated reading capability, using two interrogation units in claim 2, further comprising:
    an energy storage device for powering said voltage detection, amplification, and driver circuit wherein the input terminal of the relays are connected to the first output terminal of the relays when the energy storage device is depleted.

5. The signal activated switch, for reading a meter with automated reading capability, using two interrogation units in claim 1, whereby said connector includes an output signal line having a voltage; and the second interrogation unit senses the voltage and produces a second drive signal for switching the solid state relays.

6. The signal activated switch, for reading a meter with automated reading capability, using two interrogation units in claim 3, further comprising:
    a charge pump connected to the voltage detection, amplification, the driver circuit and the energy storage device wherein the drive signal is maintained by the charge pump and maintains sufficient voltage to the driver circuit to ensure switching of the relays.

7. The signal activated switch, for reading a meter with automated reading capability, using two interrogation units in claim 1, said peak detector includes a diode in series with a first resistor and a capacitor thereafter in parallel with a first time constant of said first resistor and said capacitor such that a stored charge on said capacitor will not decay significantly when presented with a successive pulse from the second interrogation unit clock signal; and
 a second resistor in parallel with said capacitor with said second resistor and said capacitor having a second time constant which allows said stored charge on said capacitor to decay when said successive pulse from the second interrogation unit clock signal is not present.

8. The signal activated switch, for reading a meter with automated reading capability, using two interrogation units in claim 7, said voltage detection, amplification, and driver circuit including:
 an enhancement mode N-channel mosfet having a first gate substantially connected with the peak detector, a first source connected with the ground, and a first drain connected with a P-channel enhancement mode mosfet second gate; wherein said P-channel enhancement mode mosfet has a second source connected with an energy storage device and a second drain connected with a charge pump whereby when said enhancement mode N-channel mosfet first drain pulls said second gate low said P-channel enhancement mode mosfet conducts and raises a voltage on said charge pump wherein said charge pump produces the drive signal.

9. The signal activated switch, for reading a meter with automated reading capability, using two interrogation units in claim 1, further comprising:
 a 2-wire modulated ASK half-duplex communication from the secondary interrogation unit having a first clock/data line and the ground line; wherein said first clock/data line is connected with the first signal line of the meter when the relays connect the input terminals to the second output terminals.

10. The signal activated switch, for reading a meter with automated reading capability, using two interrogation units in claim 1, further comprising:
 a meter display unit connected with the second output terminals; wherein said meter display unit having one or more switches controlling said meter display unit to display one or more elements from the group consisting of: a meter brand type, a units of totalization, a rate of flow, a meter identification number, a meter display backlight, an energy storage voltage, and a raw data multiplier.

11. A signal activated switch, for reading a meter with automated reading capability, using two interrogation units, comprising:
 a connector connected to a first signal line of the meter for receiving a clock signal, a data signal line of the meter for receiving a data signal and a ground line of the meter for receiving a common ground reference wherein the meter is a fluid or a gas meter;
 a first solid state relay and a second solid state relay wherein each relay has an input terminal connected to the connector for receiving the clock signal and the data signal and wherein each relay has a first and a second output terminal wherein the first output terminals of the each relay is connected to the clock signal and data signal inputs of a primary interrogation unit and the second output terminal of each relay is connected to the inputs of the secondary meter interrogation units respectively; and
 a peak detector circuit including a voltage detector, an amplifier, and a drive circuit wherein the peak detector receives a clock signal from the second interrogation unit when meter data is requested by the second interrogation unit wherein the peak detector detects the clock signal from the second interrogation unit to produce a drive signal that is input into the first and second relay control input to cause the relays to connect the input terminals to the second output terminals of each of the relays and wherein the input terminals of the relays are connected to the first output terminals of the first and second relays when there is an absence of the drive signal.

12. The signal activated switch, for reading a meter with automated reading capability, using two interrogation units in claim 11, further comprising:
 a meter display unit connected to the clock signal and the data signal of the second output terminals and the ground line; wherein the meter display unit displays a totalization of the meter or the flow rate of the meter.

13. The signal activated switch, for reading a meter with automated reading capability, using two interrogation units in claim 11, further comprising:
 an energy storage device for powering said voltage detection, amplification, and driver circuit wherein the input terminal of the relays are connected to the the first output terminals of the relays when the energy storage device is depleted.

14. The signal activated switch, for reading a meter with automated reading capability, using two interrogation units in claim 12, further comprising:
 an energy storage device for powering said voltage detection, amplification, and driver circuit wherein the input terminal of the relays are connected to the first output terminal of the relays when the energy storage device is depleted.

15. The signal activated switch, for reading a meter with automated reading capability, using two interrogation units in claim 11, whereby said connector includes an output signal line having a voltage; and the second interrogation unit senses the voltage and produces a second drive signal for switching the solid state relays.

16. The signal activated switch, for reading a meter with automated reading capability, using two interrogation units in claim 13, further comprising:
 a charge pump connected to the voltage detection, amplification, the driver circuit and the energy storage device wherein the drive signal is maintained by the charge pump and maintains sufficient voltage to the driver circuit to ensure switching of the relays.

17. The signal activated switch, for reading a meter with automated reading capability, using two interrogation units in claim 11, said peak detector includes a diode in series with a first resistor and a capacitor thereafter in parallel with a first time constant of said first resistor and said capacitor such that a stored charge on said capacitor will not decay significantly when presented with a successive pulse from the second interrogation unit clock signal; and
 a second resistor in parallel with said capacitor with said second resistor and said capacitor having a second time constant which allows said stored charge on said capacitor to decay when said successive pulse from the second interrogation unit clock signal is not present.

18. The signal activated switch, for reading a meter with automated reading capability, using two interrogation units in claim 17, said voltage detection, amplification, and driver circuit including:

an enhancement mode N-channel mosfet having a first gate substantially connected with the peak detector, a first source connected with the ground, and a first drain connected with a P-channel enhancement mode mosfet second gate; wherein said P-channel enhancement mode mosfet has a second source connected with an energy storage device and a second drain connected with a charge pump whereby when said enhancement mode N-channel mosfet first drain pulls said second gate low said P-channel enhancement mode mosfet conducts and raises a voltage on said charge pump wherein said charge pump produces the drive signal.

19. The signal activated switch, for reading a meter with automated reading capability, using two interrogation units in claim 11, further comprising:

a 2-wire modulated ASK half-duplex communication from the secondary interrogation unit having a first clock/data line and the ground line; wherein said first clock/data line is connected with the first signal line of the meter when the relays connect the input terminals to the second output terminals.

20. The signal activated switch, for reading a meter with automated reading capability, using two interrogation units in claim 11, further comprising:

a meter display unit connected with the second output terminals; wherein said meter display unit having one or more switches controlling said meter display unit to display one or more elements from the group consisting of: a meter brand type, a units of totalization, a rate of flow, a meter identification number, a meter display backlight, an energy storage voltage, and a raw data multiplier.

* * * * *